United States Patent
Tamer et al.

(10) Patent No.: US 8,589,513 B1
(45) Date of Patent: Nov. 19, 2013

(54) REMOTE MIRRORING OF GROUP NAME SERVICES

(75) Inventors: Philip E. Tamer, Westboro, MA (US); Douglas E. LeCrone, Hopkinton, MA (US); Daryl Kinney, Hopkinton, MA (US); Paul A. Linstead, Shrewsbury, MA (US); Michael E. Specht, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 2166 days.

(21) Appl. No.: 10/814,206

(22) Filed: Mar. 31, 2004

Related U.S. Application Data

(63) Continuation-in-part of application No. 10/746,568, filed on Dec. 23, 2003.

(51) Int. Cl.
  *G06F 15/16* (2006.01)
  *G06F 13/00* (2006.01)

(52) U.S. Cl.
  USPC ............ 709/218; 711/100; 711/114; 711/162

(58) Field of Classification Search
  USPC ............ 709/218, 227, 219; 707/10, 558, 559, 707/560, 656–660; 714/6; 711/100, 114, 711/162
  See application file for complete search history.

(56) References Cited

U.S. PATENT DOCUMENTS

| | | | |
|---|---|---|---|
| 5,742,792 A | | 4/1998 | Yanai et al. |
| 6,253,209 B1 * | | 6/2001 | Chase-Salerno et al. .. 707/104.1 |
| 6,324,654 B1 * | | 11/2001 | Wahl et al. ......................... 714/6 |
| 6,405,284 B1 * | | 6/2002 | Bridge ............................ 711/114 |
| 6,543,001 B2 * | | 4/2003 | LeCrone et al. ................... 714/6 |
| 6,745,303 B2 * | | 6/2004 | Watanabe ...................... 711/161 |
| 6,910,075 B2 * | | 6/2005 | Marshak et al. .............. 709/227 |
| 2003/0051109 A1 * | | 3/2003 | Cochran ........................ 711/162 |
| 2004/0260736 A1 * | | 12/2004 | Kern et al. ..................... 707/204 |

OTHER PUBLICATIONS

Minwen Ji, Alistair Veitch, and John Wilkes."Seneca: remote mirroring done write". USENIX Technical Conference (USENIX'03) pp. 253-268. Jun. 2003. [retrieved from Citeseer "http://www.hpl.hp.com/research/ssp//papers/Seneca-USENIX03-paper.pdf" on Dec. 18, 2009].*

* cited by examiner

*Primary Examiner* — Saleh Najjar
*Assistant Examiner* — Lashanya Nash
(74) *Attorney, Agent, or Firm* — Muirhead and Saturnelli, LLC

(57) ABSTRACT

Described are techniques used in defining and maintaining group data used by multiple host systems. Group data is stored in a distributed fashion on one or more data storage systems. If a device of a data storage system belongs to a group, group data for that group is stored on that data storage system. Group data changes made by one host are communicated to the other hosts by accessing a common data area on each data storage system using a daemon executing on each host. Remotely mirrored groups may be defined on a remote data storage system. A remote mirror of a group includes group data modified in accordance with a point of view of the remote data storage system and a remote host.

52 Claims, 26 Drawing Sheets

Control block data

| |
|---|
| GNS format indicator 502 |
| Flags 504 |
| Block size 506 |
| Symmetrix global group version number 508 |
| Number of blocks in GNS region 510 |
| Block number of first directory block 512 |
| Block number of last directory block 514 |
| Current Number of directory entries 515 |
| Max number of directory blocks 516 |
| Maximum number of GNS data blocks 517 |
| Size of free map 518 |
| Index of first byte in free_map 520 |
| Free map bitmap 522 |
| END_CONTROL_BLOCK_DATA 524 |

Directory data/one per group

| |
|---|
| Block type 542 |
| Directory flags 544 |
| Number of first block for Group 546 |
| Number of last block for Group 547 |
| Symmetrix Group version number 548 |
| GNS Group Name 550 |

REMOTE MIRRORING OF GROUP NAME SERVICES

RELATED APPLICATIONS

This application claims is a continuation-in-part of U.S. patent application Ser. No. 10/746,568, filed on Dec. 23, 2003, which is incorporated by reference herein.

BACKGROUND

1. Technical Field

This application generally relates to a computer system, and more particularly to the management of local and remote group data within the computer system.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

A data storage system, such as the Symmetrix data storage system, may include multiple devices. A group of devices may be defined and referenced by a group name. Devices included in a group may all be within the same data storage system, as well as located on different data storage systems. Group names may be associated with multiple devices for any one of a variety of different uses. Multiple hosts may reference the same group name to refer to the same set of one or more devices associated with the group name. A first device included in a group may be a local device included in a first data storage system connected to a host. The first device may have an associated remote device included in a remote data storage system. The remote device may include, for example, a backup copy of data from the first device for use in the event of problems with data on the first device. It may be desirable to provide a technique for creating and maintaining a remote mirror of the group on the remote data storage system. It may be desirable that this technique also provide for synchronizing any modifications to a group at both the local and remote data storage systems and host using the group.

SUMMARY OF THE INVENTION

In accordance with one aspect of the invention is a method for storing data about a group comprising: storing, on at least one data storage system, group data if a device of said at least one data storage system is included in said group; determining if said device is associated with another device on a remote data storage system; and if said device is associated with another device on a remote data storage system, storing a remote mirror of said group data on said remote data storage system. The group data may include at least one of: a device identifier, an attribute of a device in said group, a data storage identifier, a group attribute, and an attribute indicating that said group can have a remote mirror. The group data may be distributed on one or more data storage systems, and if a device from a first data storage system belongs to said group, a portion of said group data for said group related to said first data storage system may be stored on said first data storage system. Group data stored on a data storage system may be stored in a portion of memory of said data storage system which is accessible to each of a plurality of hosts utilizing said group data. Each of the plurality of hosts may obtain said group data by a process on said each host accessing said portion of memory of said each data storage system. The group data may be stored locally at each of said plurality of hosts. The determining whether group data for said group is included in each of said plurality of data storage systems may be performed by a process executing on each of said plurality of hosts. An application may use information about said group. The process may obtain updated group information by one of: said process polling each of said plurality of data storage systems at predetermined intervals, and by said process being notified when an update has been made to group data. The remote mirror of said group data may be created in accordance with a specified option enabling or disabling creation of remote mirrors of said group data. The remote mirror of said group data may include a first portion of data that is a modified portion of said group data in accordance with a viewpoint of said remote data storage system. The remote mirror may include a second portion of data that is a copy of a portion of said group data. The method may also include: determining a third portion of said group data that is omitted when storing data for said remote mirror of said group data, said third portion being data that is not applicable to said remote data storage system. The storing of said remote mirror of said group data may be done in response to at least one of: defining a new group, modifying an existing group, and changing device pairings of a local and a corresponding remote device. The remote mirror of said group may be used by a host connected to the remote data storage system when said at least one data storage system is unavailable. The storing of said remote mirror may be performed using an asynchronous process maintaining said remote mirror by copying group data from said at least one data storage system to said remote data storage system. The group may be a first group having a first name, and the method may further comprise: determining whether there is a group having said first name on said remote data storage system, and wherein said storing may be performed when there is no group having said first name on said remote data storage system. The method may also include: determining whether a group definition exists on said remote data storage system having said first name; if a group definition having said first name exists, determining whether said group definition is a remote mirror definition that corresponds to said group data on said at least one data storage system; and if said group definition is a remote mirror definition that corresponds to said group data on said at least one data storage system, storing data for said remote mirror in said group definition on said remote data storage system. The determining whether said group definition is a remote mirror definition that corresponds to said group data on said at least one data storage system may use an attribute and a generation number included in said remote mirror definition. The method may also include: creating a new group definition on said remote data storage system corresponding to said group if a group definition having said first name does not exist. The new group definition may include at least one attribute indicating that said new group definition is a remote mirror, and a value indicating that said new group definition corresponds to said group data on said at least one data storage system. The group data may define a set of one or more associated devices that are local to a host. The device and said other device may be defined as a local and remote device pairing. The group may have a corresponding name used to reference one or more devices included in said group.

In accordance with another aspect of the invention is a system for defining a group of one or more devices comprising: a host; a local data storage system directly connected to said host, said local data storage system including one or more local devices; a remote data storage system connected to said local data storage system, said remote data storage system including one or more remote devices; a first memory of said local data storage system that stores group data for said group, said group including a first device from said local data storage system and identifying a second device of said remote data storage system; a second memory of said remote data storage system that stores group data for a remote mirror of said group, said remote mirror including said second device as a local device and said first device as a remote device; and wherein said first host includes code that determines whether said group can have a remote mirror and stores said group data in said second memory if said group can have a remote mirror. The host may include code that: determines whether said first device and said second device are defined as a device pairing indicating that said group can have a remote mirror. The remote mirror of said group may include group data from said first memory modified in accordance with a point of view of the remote data storage system and a remote host wherein said remote data storage system is local with respect to said remote host. The group may have a corresponding name used to reference said one or more devices included in said group.

In accordance with another aspect of the invention is a computer program product for storing data about a group comprising code that: stores, on at least one data storage system, group data if a device of said at least one data storage system is included in said group; determines if said device is associated with another device on a remote data storage system; and if said device is associated with another device on a remote data storage system, stores a remote mirror of said group data on said remote data storage system. The group data may include at least one of: a device identifier, an attribute of a device in said group, a data storage identifier, a group attribute, and an attribute indicating that said group can have a remote mirror. The group data may be distributed on one or more data storage systems, and if a device from a first data storage system belongs to said group, a portion of said group data for said group related to said first data storage system may be stored on said first data storage system. Group data stored on a data storage system may be stored in a portion of memory of said data storage system which is accessible to each of a plurality of hosts utilizing said group data. Each of the plurality of hosts may obtain group data by a process on said each host accessing said portion of memory of said each data storage system. The group data may be stored locally at each of said plurality of hosts. The code that determines whether group data for said group may be included in each of said plurality of data storage systems is executed on each of said plurality of hosts. An application may use information about said group. The process may obtain updated group information by one of: said process polling each of said plurality of data storage systems at predetermined intervals, and by said process being notified when an update has been made to group data. The remote mirror of said group data may be created in accordance with a specified option enabling or disabling creation of remote mirrors of said group data. The remote mirror of said group data may include a first portion of data that is a modified portion of said group data in accordance with a viewpoint of said remote data storage system. The remote mirror may include a second portion of data that is a copy of a portion of said group data. The computer program product may also include code that: determines a third portion of said group data that is omitted when storing data for said remote mirror of said group data, said third portion being data that is not applicable to said remote data storage system. The code that stores said remote mirror of said group data may be executed in response to at least one of: defining a new group, modifying an existing group, and changing device pairings of a local and a corresponding remote device. The remote mirror of said group may be used by a host connected to the remote data storage system when said at least one data storage system is unavailable. The storing of said remote mirror may be performed using an asynchronous process maintaining said remote mirror by copying group data from said at least one data storage system to said remote data storage system. The group may be a first group having a first name, and the computer program product may further comprise code that: determines whether there is a group having said first name on said remote data storage system, and wherein said storing is performed when there is no group having said first name on said remote data storage system. The computer program product may include code that: determines whether a group definition exists on said remote data storage system having said first name; if a group definition having said first name exists, determines whether said group definition is a remote mirror definition that corresponds to said group data on said at least one data storage system; and if said group definition is a remote mirror definition that corresponds to said group data on said at least one data storage system, stores data for said remote mirror in said group definition on said remote data storage system. The code that determines whether said group definition is a remote mirror definition that corresponds to said group data on said at least one data storage system may use an attribute and a generation number included in said remote mirror definition. The computer program product may include code that: creates a new group definition on said remote data storage system corresponding to said group if a group definition having said first name does not exist. The new group definition may include at least one attribute indicating that said new group definition is a remote mirror, and a value indicating that said new group definition corresponds to said group data on said at least one data storage system. The group data may define a set of one or more associated devices that are local to a host. The device and the other device may be defined as a local and remote device pairing. The group may have a corresponding name used to reference one or more devices included in said group.

BRIEF DESCRIPTION OF THE DRAWINGS

Features and advantages of the present invention will become more apparent from the following detailed description of exemplary embodiments thereof taken in conjunction with the accompanying drawings in which:

FIG. 12 is an example of an embodiment of a control block data portion;

FIG. 13 is an example of an embodiment of a directory data portion of a block in the directory partition;

DETAILED DESCRIPTION OF EMBODIMENT(S)

Figure 1:
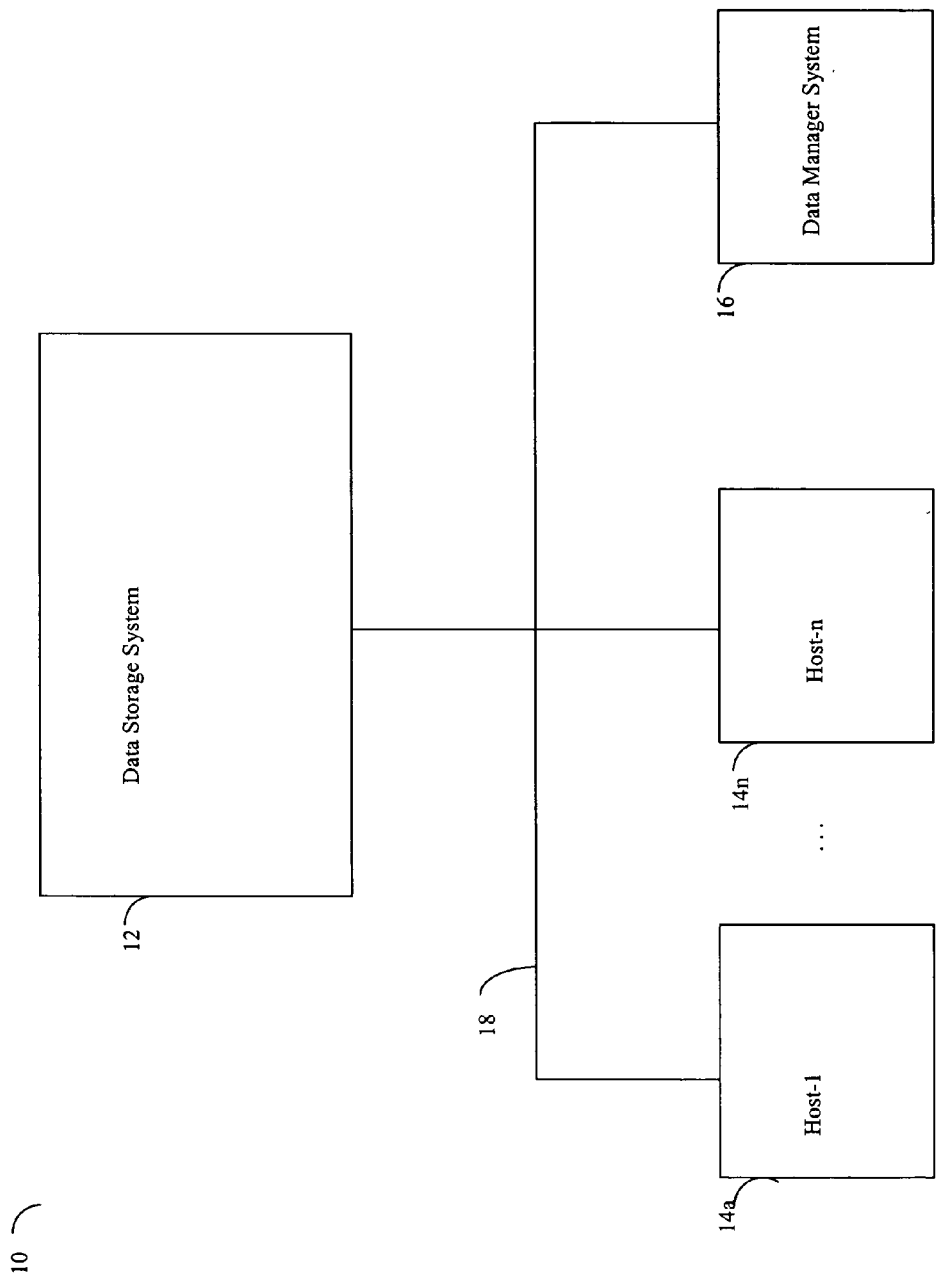
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a-14n, and a data manager system 16 through communication medium 18. In this embodiment of the computer system 10, the N hosts 14a-14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a-14n, and the data manager system may access and communicate with the data storage system 12, and may also communicate with others included in the computer system 10.

Each of the host systems 14a-14n, the data manager system 16, and the data storage system 12 included in the computer system 10 may be connected to the communication medium 18 by any one of a variety of connections as may be provided and supported in accordance with the type of communication medium 18. The processors included in the host computer systems 14a-14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a-14n and the data manager system 16, as well as those components that may be included in the data storage system 12 are described herein in more detail, and may vary with each particular embodiment. Each of the host computers 14a-14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different types of administrative tasks. In the embodiment of FIG. 1, any one of the host computers 14a-14n may issue a data request to the data storage system 12 to perform a data operation.

Figure 2:
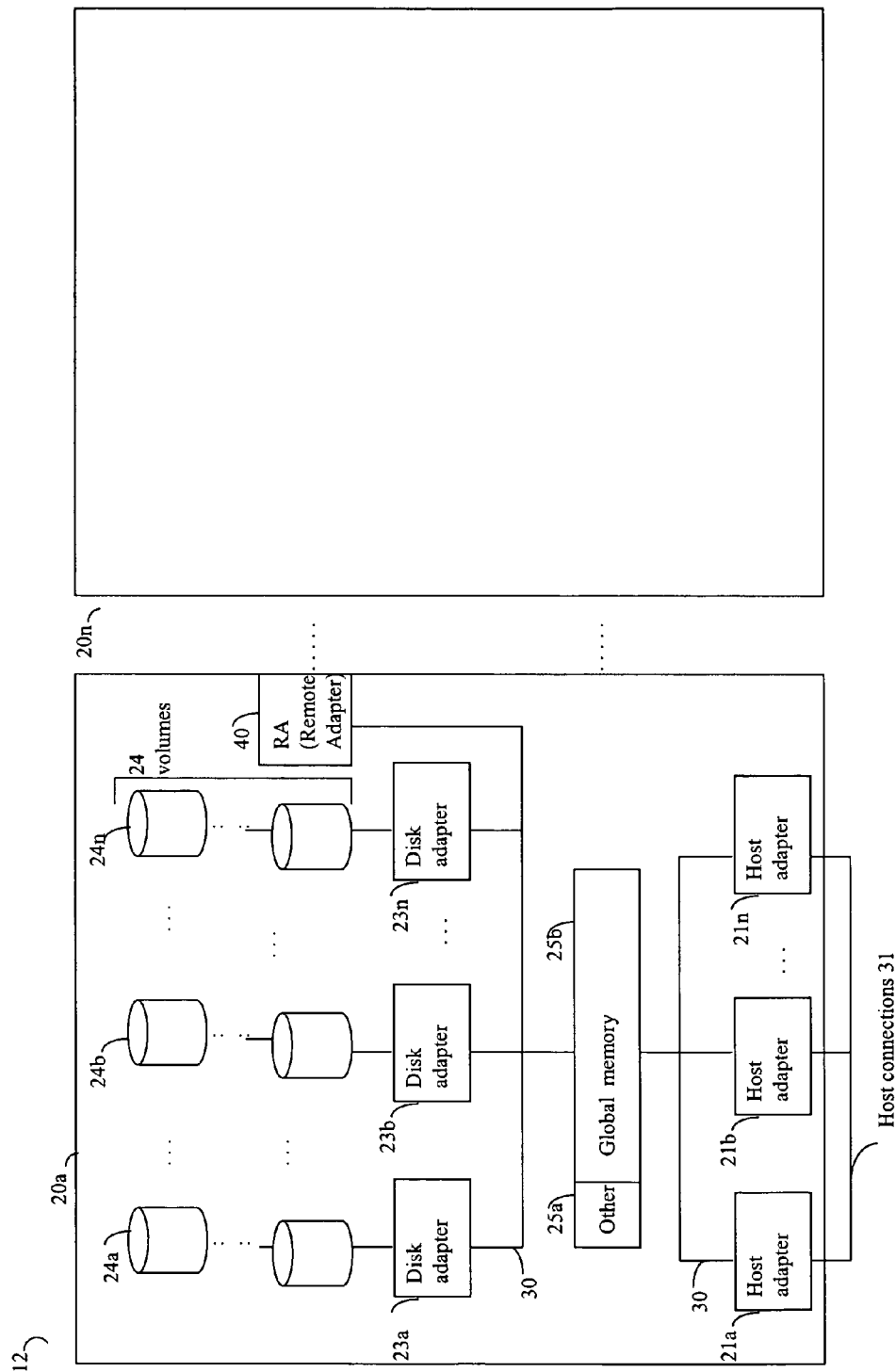
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20a-20n as manufactured by EMC Corporation of Hopkinton, Mass. In this particular example, each of the Symmetrix™ storage systems 20a-20n may be inter-connected (not shown) as well as to the host and data manager systems through any one or more communication connections 31 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include other types of data storage systems in combination with one or more Symmetrix™ systems. Each of 20a-20n may be resources included in an embodiment of the computer system 10 to provide storage services to, for example, host computer systems and/or the data manager system.

Each of the Symmetrix™ systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the Symmetrix™ system 20a, a single DA, such as 23a, may be responsible for the management of a row of disks or volumes, such as row 24a. Each of the DAs 23a-23n are connected, for example, by a bus 30 to a cache that includes a particular portion designated as global memory 25b. The DAs 23a-23n may perform data operations to and from the cache that may be included in the global memory 25b, for example, in communications with other disk processors or directors, and other components of the system 20a. Generally, the global memory 25b may be used in facilitating communications between components in the system 20a. The other portion 25a is that portion of memory that may be used in connection with other designations that may vary in accordance with each embodiment. In one embodiment, portions of configuration and device information may be stored in global memory 25b.

The system 20a may also include one or more host adapters ("HAs") or directors 21a-21n. Each of these HAs may be used to manage communications and data operations between one or more host systems and the global memory.

It should be noted that the directors or processors within a data storage system as illustrated in FIG. 2 may communicate with global memory using communication connections other than through a bus, switch, and the like. An embodiment, for example, may provide dedicated communication paths with point-to-point connections between directors and global memory to provide for obtaining data without incurring the overhead of bus arbitration and switch contention. Additionally, an embodiment may use a data storage system having a global memory configured with independent global memory regions, each with separate access logic.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20a is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations of multiple LVs that may reside on a disk. The DA may accomplish this by creating job records for the different LVs associated with the particular DA. These different job records may be associated with the different LVs in a data structure stored and managed by each DA.

Figure 3:
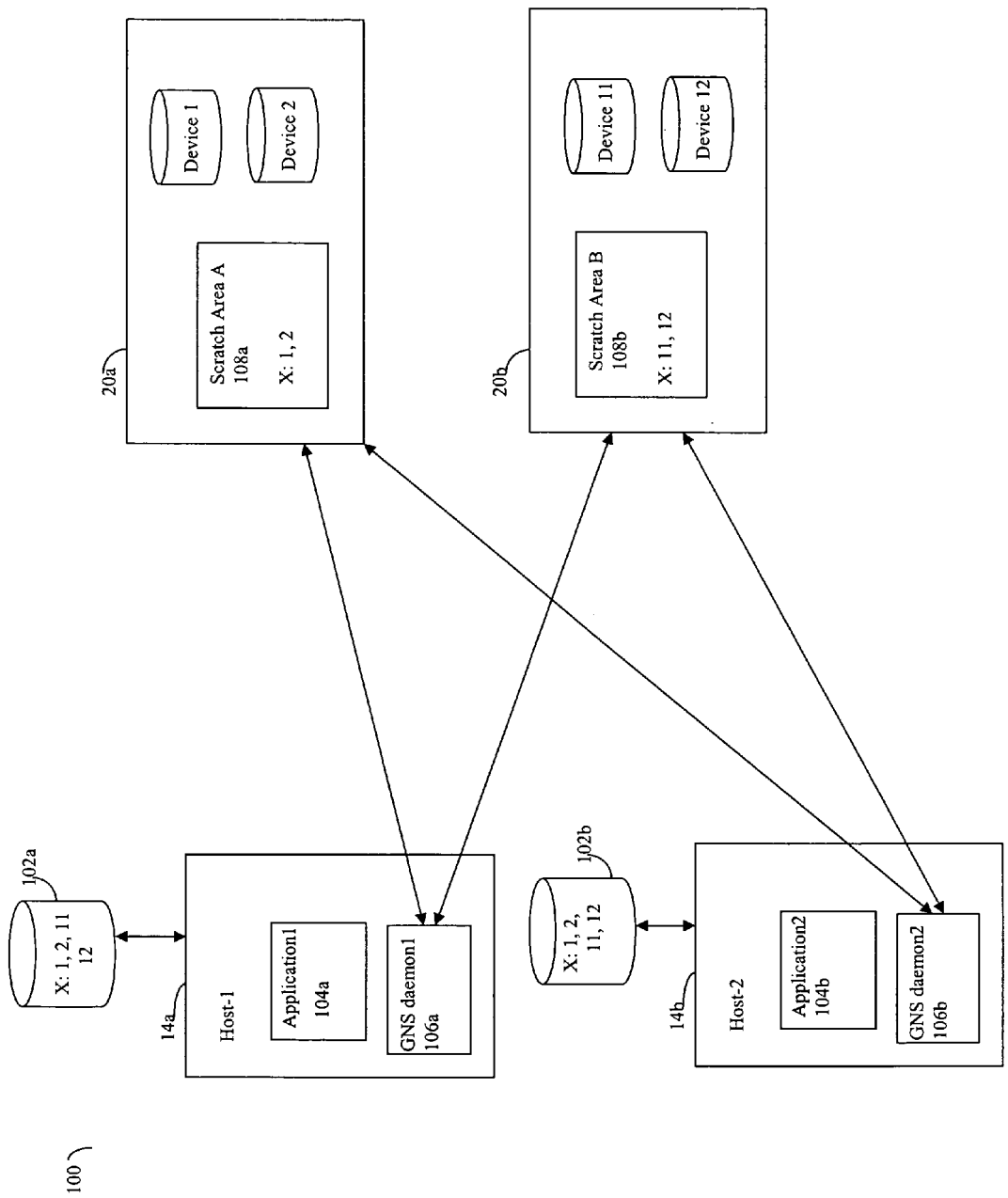
FIG. 3 is a more detailed example of components that may be included in an embodiment of the computer system of FIG. 1.

Referring now to FIG. 3, shown is a more detailed example of an embodiment of the computer system 10 previously described in connection with FIG. 1. It should be noted that the example illustration 100 of FIG. 3 includes particular components of the computer system as needed to illustrate the techniques for local group name services (GNS) described herein but should not be construed as a limitation.

In the computer system 100, included is a first host system 14a, a second host system 14b, a first data storage system 20a, and a second data storage system 20b. Host1 14a has local storage 102a. Similarly, host 2 14b has local storage 102b. Included on each of the host systems is a daemon process. In particular, included in the host 1 14a is GNS daemon 1 106a. Host system 14a may also include one or more applications, such as application 1 104a. It should be noted that in connection with the techniques described herein, the application as shown executing on each of the host systems is not required for use of the techniques described herein, but rather is one way in which an operation or command may be made in connection with the data storage systems 20a and 20b.

Included in each of the data storage systems, such as 20a, is a scratch area, such as scratch area A 108a. As described elsewhere herein in more detail, the scratch areas of each of the data storage systems are used in connection with group name services for storing information about group definitions, attributes and the like. Data storage system 20a includes device 1 and device 2. Data storage system 20b includes device 11 and device 12. In this particular example, a group X is defined which includes device 1 and device 2 of data storage system 20a, and devices 11 and 12 of data storage system 20b. Included on the local host storage 102a for host 1 14a is a local copy of the group X definition illustrating that host 114a has a group X defined as including devices 1, 2, 11, and 12. Similarly, host 2 14b also includes a local copy of the group X definition in its local storage 102b. Each of the data storage systems may include devices other than as shown in the example 100 as well as other components than as shown in the illustration 100. It should be noted that in one embodiment, the GNS daemon on each host may update and maintain a set of group definitions locally on that host in an in-memory cache. When the GNS daemon starts or restarts, the group definitions may be read from each data storage system and the in-memory cache copy of the group definitions may be reconstructed. Clients of the GNS daemon, such as an application executing on a host, may write and maintain an application local copy of the group information in local storage. The requests for group information, as services by the GNS daemon, may use the GNS daemon's in-memory cache copy. The local storage copy of the group information as may be maintained by an application may be used, for example, in connection with diagnostic processing. Other embodiments may use other techniques in connection with servicing requests for the group data.

Each of the GNS daemons included on each of the host systems communicates at various points in time with each of the data storage systems. As will be described in more detail in following paragraphs, each of the host systems using the technique described herein does not communicate with the other hosts in connection with group name services and management. Rather, each of the GNS daemons communicates with the data storage systems in connection with group name services and management of group data. In one embodiment, each of the GNS daemons on each host polls each data storage system to see if there have been any changes to the group name services data. Using this technique, each GNS daemon is responsible for maintaining in an automated fashion group definitions as viewed by the host system upon with the GNS daemon is executing. In one embodiment, the GNS daemon accesses the group information stored in each scratch area of each data storage system. The GNS daemon then updates the host local copy of group data as may be maintained in an in-memory cache described elsewhere herein.

Defined in scratch area A 108a of data storage system 20a is information on group X for those devices of data storage system 20a which are defined as being included in group X. Similarly, scratch area B 108b of data storage system 20b includes information on group X in connection with those devices of the data storage system 20b that are included in the group X definition. The data structures used in one particular embodiment for storing this group information within the data storage system scratch areas are described elsewhere herein in more detail. The simplification shown in the illustration 100 is for the purposes of explanation.

In one embodiment, each of the scratch areas of a data storage system may be designated as a portion of global memory. Other embodiments may use other portions of memory or other storage that are accessible to each of the host systems and available to each of the GNS daemons executing on each of the host computer systems. It should be noted that in this embodiment, the data stored in the scratch areas may also be stored on a persistent form of data storage.

As described herein, a group may include one or more devices. Each of the one or more devices belonging to a group may all be on the same data storage system, such as on a single the Symmetrix data storage system described in this embodiment. Alternatively, the devices included in a single group may span multiple data storage systems. A group name may be used in connection with performing any one or more of a variety of operations. The group name may be used, for example, to reference all of the devices in connection with a group and perform an operation or command in connection with all the group's devices. As an example, a group name may be used in connection with issuing a command to split off copies of data maintained consistently across devices included in a group such as in connection with disaster recovery procedures, and the like. Another example is an operation or command that may reference a group for disabling I/O operations to all devices within a particular group.

The illustration 100 of FIG. 3 includes group data such as indicated on each of the local host storage devices such as 102a and 102b and the in-memory cache copy as used by the GNS daemon representing a snapshot of a group definition at a particular point in time. It should be noted that the local copy of the group data as stored in the in-memory cache copy as well as on the data storage devices 102a and 102b on the host may be stored in any one of a variety of different data organizations.

As will be described in more detail in following paragraphs, group definitions, attributes, and the like may be modified, such as, for example, in connection with adding and/or removing devices from a particular group.

The techniques described herein used in connection with group name services and the management of group data may be used to maintain consistency among host-local copies of group data and to facilitate sharing of modified group data in an automated fashion among multiple host systems.

Figure 4:
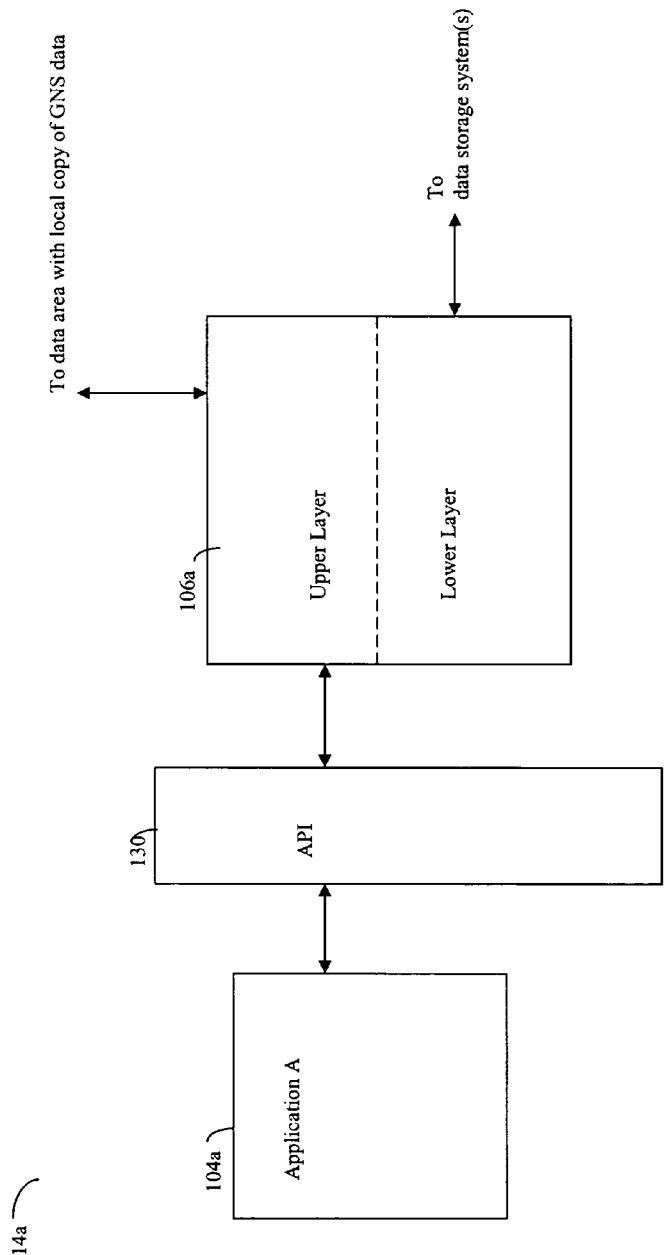
FIG. 4 is an illustration of data flow between components that may be included in a host system.

Referring now to FIG. 4, shown is an example of components included in a host system 14a of FIG. 3. What will now be described in connection with the components that may be included in a host system 14a is the data flow from an application on one host to the data storage systems in connection with performing a particular operation, request, or command as may be issued by a host-side application, such as application A 104a.

Application A 104a may issue an operation or request using an API 130. In this embodiment, the API 130 may be the SYMAPI supplied by EMC Corporation for use with the Symmetrix data storage systems. The SYMAPI includes a predefined set of application programming interfaces (APIs) that may be used in connection with performing operations with the Symmetrix data storage systems. Other embodiments may use other techniques and other APIs in connection with performing operations as may be issued by an application such as application A 104a executing on a host system. The API is the interface provided in this embodiment for communications between an application and the GNS daemon 106a. The daemon 106a may include an upper layer and a lower layer. The API 130 interfaces with the upper layer of the GNS daemon 106a. In particular, the upper layer of 106a handles application requests and may, in turn, interface with the lower layer of 106a, maintain the GNS daemon's in-memory cache, and may also access the in-memory cache in accordance with the particular operation(s) to be performed for each API. The lower layer of the daemon 106a is invoked by the upper layer and interfaces with the data storage systems. The lower layer, for example, may handle any locking of the areas of the data storage systems and may access the data stored thereon as needed by the host. As described herein using the techniques for group name services, the lower layer of each of the daemons may be used in connection with sending and/or receiving messages between the daemon and the data storage systems to maintain group name data on each host and on each data storage system. The lower layer of each of the daemons may also be used in communicating with data storage systems to perform requests, such as those issued from the application A 104a using the API 130.

An embodiment of each of the components included in the host systems such as 14a may be written in any one or more of a variety of different programming languages used in connection with producing machine executable instructions that are executed on each of the host systems. The machine executable instructions may be stored, for example, in a random access memory (RAM), read-only memory (ROM), programmable read-only memory (PROM), and the like. As known to those of ordinary skill in the art, any one of a variety of different techniques may be used in connection with providing the appropriate hardware and/or software to implement the techniques described herein.

Figure 5:
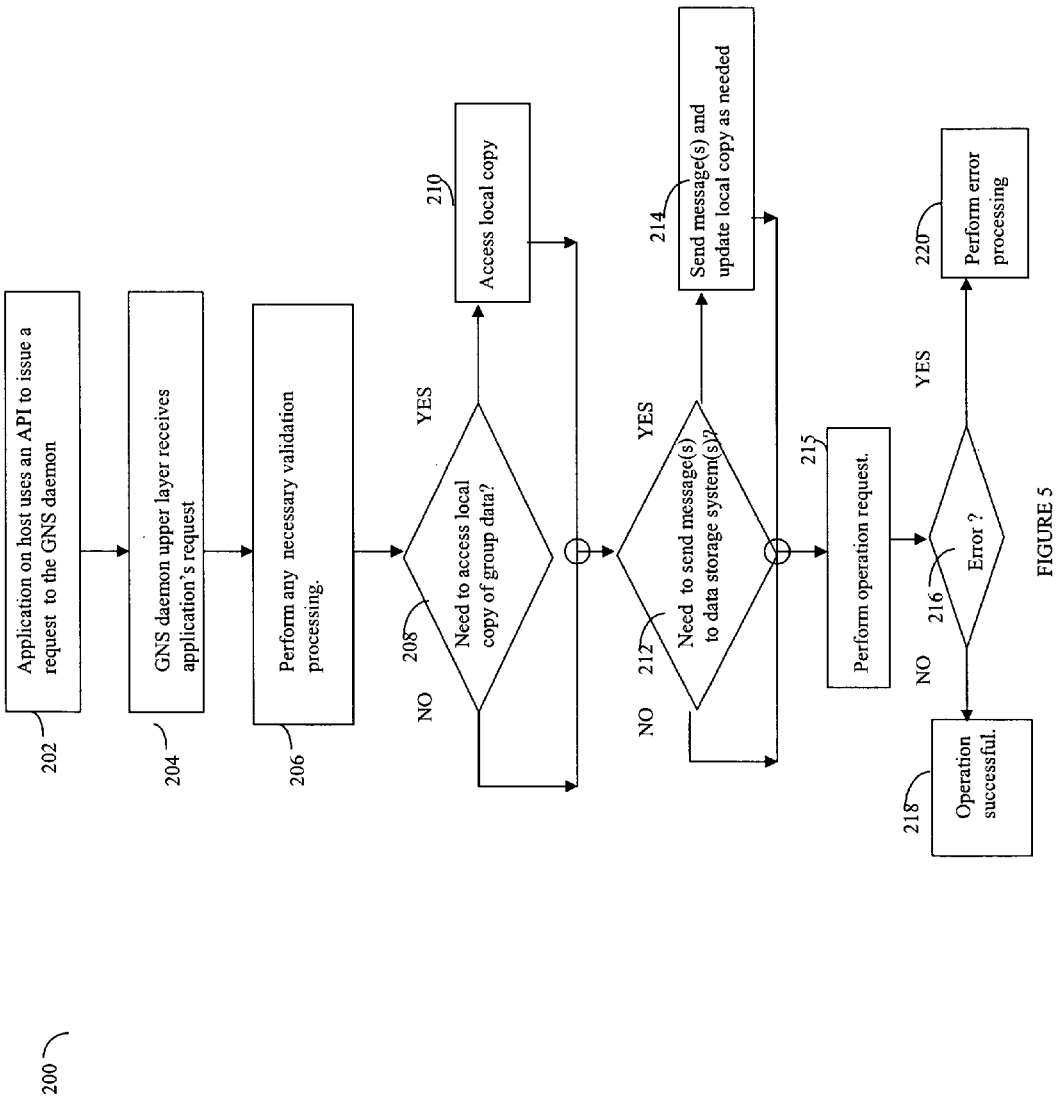
FIG. 5 is a flowchart of method steps of one embodiment for processing an application's request in connection with group name services.

Referring now to FIG. 5, shown is a flowchart 200 of steps of one embodiment that may be performed on a host system processing an application's request. The application's request may be issued, for example, using an API described in connection with FIG. 4.

At step 202, the application on the host uses an API to issue a request for an operation to the GNS daemon located on that particular host. At step 204, the upper layer of the GNS daemon on the host receives the application's request. The API may be a call that performs a group operation resulting in one or more group data operation if GNS is enabled, as described elsewhere herein. At step 206, the upper level of the GNS daemon may perform any necessary validation processing associated with the application's request. This may include, for example, validation processing such as in connection with the API parameters received in connection with the application's request. Other embodiments may perform other types of validation processing at step 206. Control proceeds to step 208 where a determination is made as to whether, for that particular application request, there is a need to access the host local copy of the group data as may be stored in the in-memory cache. If so, control proceeds to step 210 where the local copy is accessed and any data is obtained from that local copy. Control then proceeds from step 210 to 212.

If, at step 208, a determination is made that the local copy of the group data is not needed, control proceeds directly to step 212. At step 212, a determination is made as to whether, for the particular application's request, there is a need to send one or more messages to the data storage systems. If not, control proceeds from step 212 to 216. If it is determined at step 212 that messages need to be sent to one or more data storage systems in connection with performing the application's request, control proceeds to step 214 where the one or more messages are sent to the appropriate data storage systems in performing the operation or operations associated with the applications request. An embodiment may also update the local copy of the group data stored in the in-memory cache in accordance with information received from the data storage system(s) in connection with the one or more messages. This may occur, for example, if a message is sent to a data storage system requesting up to date group information as may be stored in a scratch area. Control then proceeds from step 214 to step 215 where the request operation is performed. At step 216, a determination is made as to whether there has been an error in connection with any of the foregoing processing steps. If so, control proceeds to step 220 where error processing may be performed. Error processing may include, for example, performing one or more return validation processing steps and/or returning an error code or other type of condition status to the application which issued the request. Other embodiments may include other types of error processing at step 220. If, at step 216, it is determined that no error has occurred in processing, at step 218 the operation associated with the request made by the application is deemed successful. As part of step 218 processing, an embodiment may return a successful status code to the calling application as well as other processing steps that may vary with each embodiment.

It should be noted that the particular determination as to whether a host local copy of the group data is to be accessed as well as the assessment or determination as to whether messages need to be sent to the one or more data storage systems vary in accordance with each of the different requests and associated operations. Additionally, whether a host's local copy of group information is used for a particular command may also vary in accordance with each particular embodiment as well as particular parameters and settings that may be included in an embodiment. For example, certain types of commands or operations included in the application's request may result in returning information to the application about a particular group such as its devices membership, attributes about devices in the particular group, and the like. An embodiment may elect to use the local copy of the group information in connection with performing operations, such as, for example, query operations to list groups or group information. An embodiment may also choose to first read or obtain an up-to-date copy of information as may be stored on each of the data storage systems rather than use information included in the local copy. This may be performed, for example, prior to performing group modification operations. Such an option may be specified, for example, as a system or setup parameter. An embodiment may also only provide for using one or the other of the foregoing techniques rather than optionally including both techniques and providing a switch setting mechanism for toggling between the different techniques.

It should be noted that the processing step of flowchart 200 of FIG. 5 may be characterized as general processing steps performed in an embodiment in connection with a GNS group data request or operation. More specific examples and detail for particular GNS data operations are described elsewhere herein.

Figure 6:
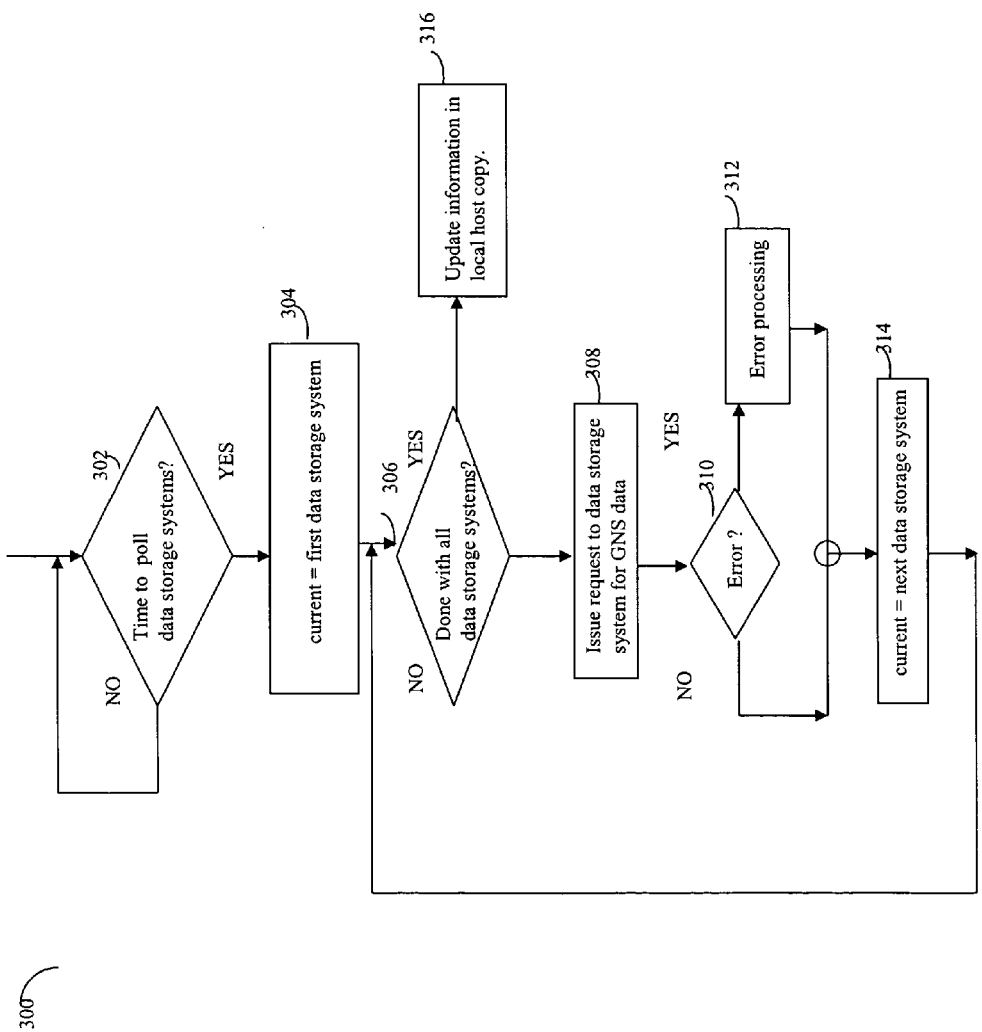
FIG. 6 is a flowchart of method steps of one embodiment that may be executed by each host-side group name service (GNS) daemon.

Referring now to FIG. 6, shown is a flowchart 300 of steps that may be performed in one embodiment by each of the daemons included on each of the host systems. At step 302, a determination is made as to whether it is time to poll the data storage systems. If not, control continually returns to step 302 until a determination is made that it is time to poll the particular data storage systems for information. An embodiment may set a polling time interval for each daemon individually, or for all or a portion of the daemons using setup parameters for the host systems. The particular polling interval selected may vary in accordance with the particulars of each embodiment.

It should be noted that the flowchart 300 of FIG. 6 provides for each of the daemons polling, at predetermined time intervals, each of the data storage systems in order to obtain group name information as maintained by each of the data storage systems. The daemon then uses this information obtained from each of the data storage systems to update the local copy of group data on that particular host. This is how each of the host systems maintains an up-to-date copy for the various group definitions. At step 304, the variable current is assigned the first data storage system. At step 306, a determination is made as to whether the daemon of the host system is done with polling the data storage systems. If so, control proceeds to step 316 where the local copy of the group data is updated. Otherwise, at step 306, if a determination is made that all data systems have not been polled, control proceeds to step 308 where a request is issued to the current data storage system for its copy of the group data as stored in the scratch area of the current data storage system in this embodiment. At step 310, a determination is made as to whether an error has occurred in issuing a request to the data storage system identified by the variable current. If so, control proceeds to step 312 where error processing is performed. Error processing may include any one of a variety of different steps such as, for example, reissuing the request and other steps depending on the particular error message that has been received, and the like. If no error has occurred, control proceeds to step 314 where the next data storage system is assigned to the variable current. Control then proceeds to step 306 where a determination is again made as to whether polling for all of the data storage systems is complete.

The processing steps of flowchart 300 may be performed by each of the daemons as included in each of the host systems in connection with maintaining a local up-to-date copy of the group data that may be included, for example, in an in-memory cache on each of the host computer systems. It should be noted that although the foregoing description uses polling in connection with communicating information between the host-side daemons and the data storage systems, other embodiments may use other techniques in communicating group name data as maintained by each data storage system to the hosts. For example, an embodiment may have a data storage system send a notification to each host-side GNS daemon when a change is made to group membership information as maintained by that data storage system. Other embodiments may use other techniques.

It should be noted that an embodiment may poll the one or more data storage systems in parallel as well as sequentially to obtain group data.

The group definitions maintained using the techniques described herein may be used in connection with any one or more other applications within one or more of the host computer systems. Updates to a group may be automatically propagated and/or used by other applications, such as PowerPath.

In one embodiment, PowerPath by EMC Corporation may be used in one or more of the hosts. PowerPath may perform a variety of different operations including, for example, intercepting and redirecting I/O requests, performing automatic load balancing among multiple outgoing channels, and the like. PowerPath may use consistency groups to ensure that all members, such as devices, of a consistency group have data that is in a consistent state. In one embodiment, consistency groups as may be used by PowerPath, may be defined using groups such that PowerPath may also use a host-side database that subscribes to the services described herein in connection with group data updates. PowerPath may subscribe to the services, such as of the daemon, and be provided with updates to group data. GNS may automatically notify PowerPath when a particular group of interest to PowerPath has been updated. It should be noted that PowerPath is just an example of one application that may use and subscribe to the functionality described herein related to group data and updates thereto.

In connection with the processing steps of FIG. 6, it should be noted that the local host copy of the group data may be updated after obtaining any group data for each data storage system. An embodiment may also batch updates to the local host copy at other intervals other than on a per data storage system basis or after gathering all of the updates from all of the data storage systems as described in connection with flowchart 300 processing. This may vary in accordance with each embodiment.

The techniques described herein in connection with GNS may be enabled/disabled using a switch option or setting, for example, that may be specified in a configuration file. An embodiment may also provide one or more APIs in connection with obtaining a current value of a GNS setting, and for dynamically modifying a GNS setting within the configuration file, for example, by specifying a GNS setting associated with a flag for enabling or disabling GNS. As described herein, when GNS is enabled, group information is shared among a plurality of hosts. When GNS is disabled, device group operations may be performed using a local copy of group data that may be maintained at each host system. It should be noted that the local copy of the group data within each host used when GNS is disabled may be different in an embodiment than the local copy of GNS group data described and stored, for example, on device 102a in FIG. 3. In other words, an embodiment may maintain two local copies of the group definitions: one for use when GNS is enabled (GNS group data), and another for use when GNS is disabled (non-GNS group data). The actual group definitions for use when GNS is enabled are those as maintained by each of the data storage systems. As described herein, GNS may be enabled or disabled on a per host basis. Additionally, GNS may be enabled or disabled on a per session basis.

Figure 7:
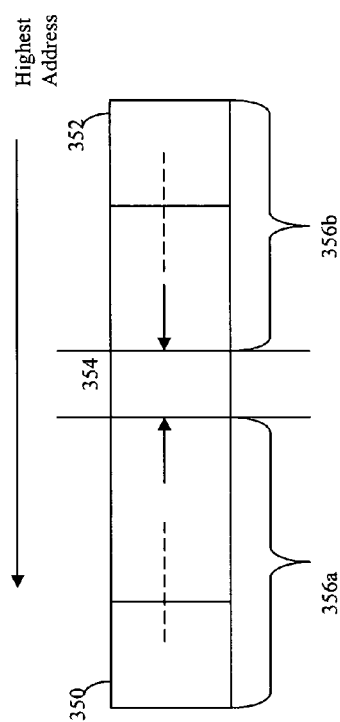
FIG. 7 is an example of an embodiment of a scratch area.

Referring now to FIG. 7, shown is an example of an embodiment of a scratch area 108a shown in more detail. As described herein, each of the data storage systems such as 20a and 20b may maintain its own scratch area. The scratch area 108a within data storage system 20a may be used for communicating data between one or more of the host computer systems. It should be noted that each of the scratch areas that may be maintained and used by each of the data storage systems are similar to that as described in connection with FIG. 7. As used in one embodiment, the scratch area of each data storage system may be used for one or more purposes in addition to being used for group data. For example, the scratch area in one embodiment is used with group data and also as a cross communications area for communicating other data between one or more of the host systems. Scratch area 108a in this embodiment may be used simultaneously for the purposes of cross host communications as well as a persistent repository for storing group definitions.

In one embodiment, the scratch area 108a may be statically divided into fixed size sub areas. It should be noted that an embodiment may use a more dynamic approach in which space from the scratch area may be allocated based on one or more usage patterns.

Shown in FIG. 7 is a left hand side of the scratch area 350 and a right hand side of the scratch area 352. In one embodiment, GNS may obtain portions of the scratch area as needed from right to left beginning with portion 352. Uses of the scratch area for other purposes besides groups in connection with GNS obtain storage from the left hand portion beginning with portion 350 and are allocated additional portions from the left to the right progressing towards the center. Management techniques are used in connection with maintaining the scratch area to ensure that there are no usage conflicts.

In one embodiment of the data storage system using the scratch area as described herein in FIG. 7, the scratch area may be generally divided into three regions. The left region 356a may be used in connection with non-GNS data The right-most region 356b may be used in connection with GNS operations and for GNS data storage. Between the left and right-most regions, 356a and 356b, respectively, is an unused region 354. This unused region 354 may be used as a buffer region in connection with separating the different regions of the scratch area. Both the left and right regions grow towards the middle unused region 354 as different portions of the scratch area are allocated for use until the boundary of 354 is reached. Other embodiments may use other techniques in connection with managing the scratch area than as described therein. As described in more detail elsewhere herein in this embodiment, the scratch area region 356b for GNS uses may be partitioned into a sequence of fixed size blocks managed by a bitmap to indicate which of the particular fixed sized portions are free. As an alternative, an embodiment may maintain a free list with identifiers as to which particular blocks within the region 356b are free or available for use.

Using the techniques described herein, the scratch area of each data storage system is just one location that may be used in connection with storing group information for each of the data storage systems. Other techniques may be used in connection with maintaining other data storage locations for storing the group information.

The techniques described herein for storing and using the scratch area of each of the data storage systems for GNS may be characterized as a distributed approach in which each of the data storage systems maintains and stores group data holding that portion of the group definition corresponding to devices residing within that data storage system. It should be noted that group attributes that do not apply to a specific storage system such as, for example, a creation time, a modification time, and the like, may be duplicated on all Symmetrix data storage systems that a particular group spans. In other words, those attributes of a group that are not particular to one data storage system may be duplicated on all Symmetrix data storage systems that the group spans.

The GNS daemon, as may be included on each of the host systems in one embodiment, will now be described in more detail. In the embodiment described herein, the GNS daemon is the only host entity that may be used in connection with directly accessing information of the GNS repository as may be stored in the scratch areas of each of the data storage systems. Each host that performs management operations in connection with GNS executes an instance of this GNS daemon. As also described herein, the GNS daemon may perform a number of functions. GNS daemons listen for GNS requests from local clients, for example, in connection with applications located on the same host, and perform operations in connection with GNS as described herein. For performance reasons, each of the GNS daemons may cache all group definitions in memory for use during execution. This memory cache is reconstructed each time the GNS daemon starts up. When group modifications are requested, for example, as by an application executing on a host system, the daemon executing on that particular host system updates the appropriate GNS repositories on corresponding Symmetrix data storage systems.

The GNS daemons monitor the GNS repositories on all directly connected data storage systems for changes made by other daemons from other hosts. Such changes are reflected in the memory cache of the GNS daemon. In one embodiment, a GNS daemon may make available to clients within a single host computer system those changes as may be included in groups defined using GNS. In one embodiment, these local clients which are local to a particular host are notified by the GNS daemon executing on that particular host when that particular client specifically asks or polls the daemon for changes that may have occurred from the last time the particular local client had polled the daemon. It should be noted that other embodiments may use other techniques in connection with propagating any group definition changes as obtained by a GNS daemon on a host to other local clients on a particular host. For example, an embodiment may use an asynchronous event mechanism causing a GNS daemon on a particular host to communicate group changes to one or more local clients. An embodiment may use, for example, a call back or other type of asynchronous event mechanism.

The GNS daemon on each host may be started automatically at system boot time. In the event that a GNS daemon is not executing when a local client, such as an application, attempts to connect to the daemon, for example, in connection with performing a SYMAPI function, the daemon may be started on the host system at the time of first or next use. The daemon, and other processes, may automatically be monitored to ensure that a daemon is executing at all times on a host computer system. A background task may be used in monitoring the GNS daemon execution as well as the execution state of other processes. The background process may automatically restart the GNS daemon in the event that the GNS daemon crashes or is otherwise found not to be executing by the monitoring background process.

The GNS daemon may be configured using one or more configuration options that may be included in a configuration file. Particular options that may be used in an embodiment may vary in accordance with particulars included therein. For example, one of the daemon options that may be included in the configuration file may be used in connection with determining whether a GNS daemon is permitted to execute on a particular host system. In connection with this aspect, group operations or requests may fail if GNS behavior is enabled for the particular host system, but the GNS daemon isn't permitted to run. An embodiment may use an authorization file in connection with specifying what particular user or users on a host are permitted to operate on GNS groups. Group operations requested by a particular user will fail if GNS behavior is enabled for a particular host system and the user isn't authorized to perform GNS operations as specified in accordance with the authorization file. An option may also be specified, for example, relating to how often to poll the data storage systems and how often to notify PowerPath of any group changes.

Figure 8:
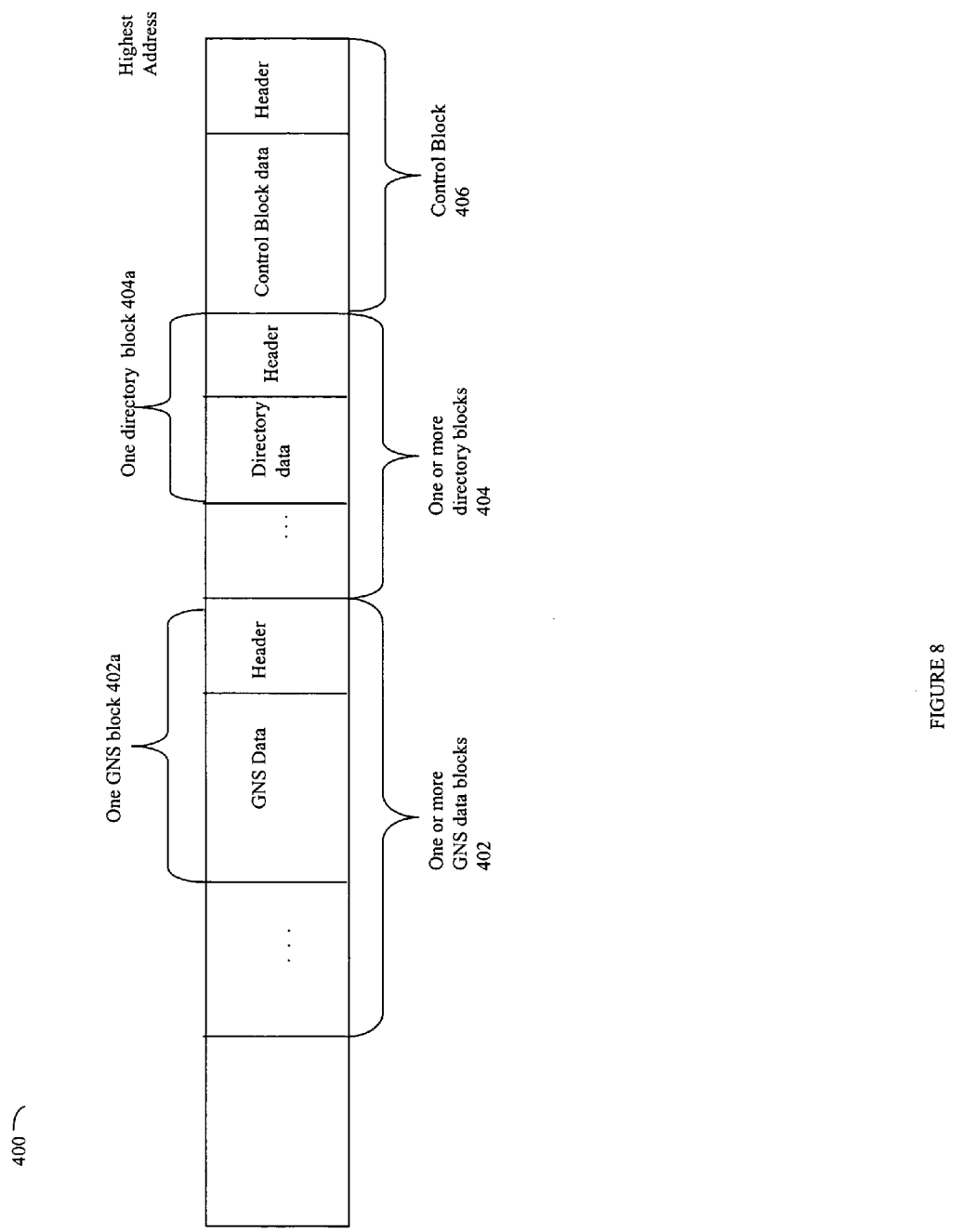
FIG. 8 is an example of an embodiment of a GNS data region of the scratch area.

Referring now to FIG. 8, shown is an example of one embodiment illustrating how the GNS data region 356b of a scratch area may be structured. In this particular embodiment 400, the highest address of the scratch area is associated with the right-most address of the region 356b used in connection with GNS data as maintained on each data storage system. In the embodiment 400, the region 356b is divided into fixed size blocks. A block size, for example, such as 512 bytes, may be used. The block size selected may vary with each embodiment. Blocks may be numbered from block number zero to block number N where block number zero has associated with it the highest address. In this example 400, the control block may be designated as block number zero. Subsequently, as blocks go from right to left, the block number increases as the address associated with the block decreases. The embodiment 400 of FIG. 8 as described herein allocates blocks from the right-most portion of the scratch area towards the center of the scratch area.

The embodiment 400 includes a control block partition 406, a directory block partition 404 and a GNS data partition 402. The control block partition includes a single control block. The directory block partition 404 includes one or more directory blocks 404 followed by one or more GNS data blocks included in partition 402. The control block of 406 is located at the highest address of the scratch area and includes a header portion and a control block data portion. Similarly, each of the directory blocks in 404 includes a fixed header portion followed by an associated directory data portion. Each of the GNS data blocks in 402 includes a fixed header portion followed by a GNS data portion. As described in following paragraphs, a single GNS logical data entry of portion 402 may be stored in one or more blocks.

Figure 9:
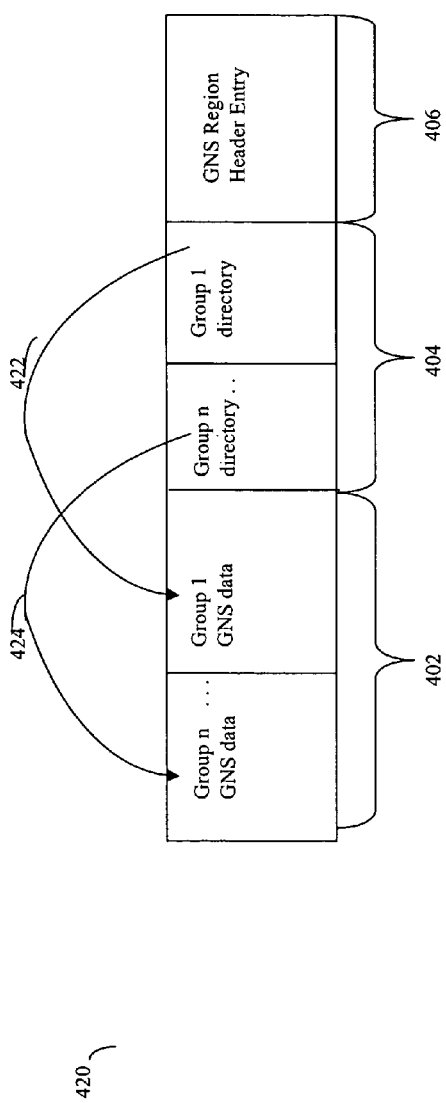
FIG. 9 is an example of a logical representation of the GNS data region of FIG. 8.

Referring now to FIG. 9, shown is a logical representation 420 of the structure 400 described previously in connection with FIG. 8. The one or more blocks included in partition 402 correspond to group data that includes, for example, attributes associated with each of the particular groups. Partition 404 includes one or more directory entries in which there is one directory entry for each group included in this particular data storage system. Partition 406 includes the GNS region header entry corresponding to the control block previously described in the embodiment 400. Partition 402 includes group data entries corresponding to the different groups included in the directory partition 404. Each of the group directory entries in this embodiment, as will be described in following paragraphs, includes a pointer or identifier to the first block of GNS data corresponding to that particular group. The GNS data entry associated with a particular group, such as group 1 or group N, may be stored in more than one GNS data block in the event that all of the GNS data describing a single group is not able to fit within a single block. This may occur, for example, if there are more attributes associated with a particular group than may be included within a single block in accordance with the block size selected in an embodiment. If the GNS data entry associated with a particular group is spread across multiple GNS data blocks of section 402, the multiple GNS data blocks may be linked together, for example, in the form of a linked list as will be described in following paragraphs. It should be noted that any given data block of GNS data in 402 only holds data associated with a single particular group.

As described herein, data from region 356a of the scratch area is allocated from left to right. Blocks of the region 356a of the scratch area may be marked as free or available for use. Free space may be managed using a bitmap stored within a dedicated control block as may be included, for example, in the GNS region header entry 406. This is also described in more detail in the following paragraphs. Shown in the logical representation 420 are pointers 422 and 424 pointing to, respectively, the GNS logical data entries associated with the first and nth groups. As also described in more detail elsewhere herein, an embodiment may also include pointers in addition to 422 and 424 as illustrated in 420. It should be noted that in this particular embodiment, a bitmap may be used and provide a variety of advantages, for example, in connection with ease of allocating sequential blocks for efficient I/O management as well maintaining a state of relative compactness in describing the free space.

Figure 10:
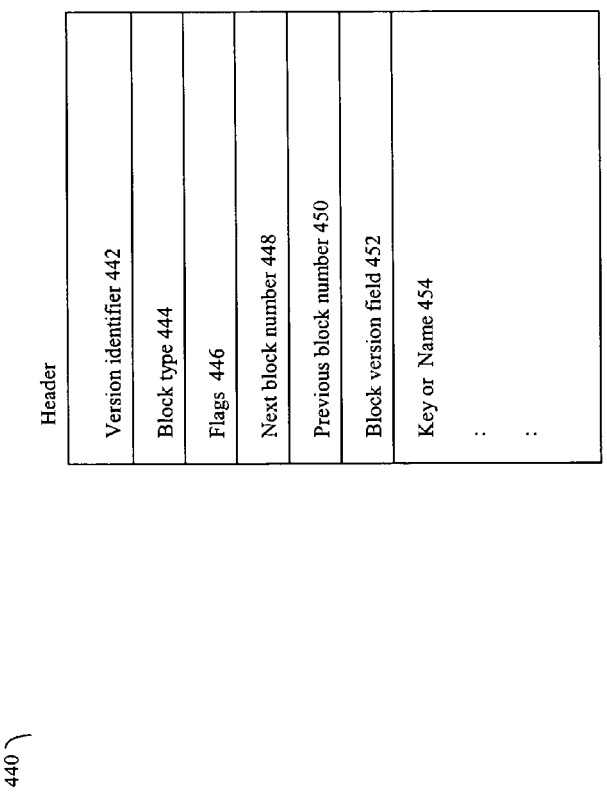
FIG. 10 is an example of an embodiment of a header portion included in each block of the GNS data region of the scratch area.

Referring now to FIG. 10, shown is a more detailed description of one embodiment of a header portion as may be included in each block within the embodiment 400. Each block of the region 356b in this embodiment begins with a fixed header portion 440. The header 440 includes a version identifier field 442, a block type field 444, a flags field 446 a next block number field 448, a previous block number field 450, a block version field 452 and key or name field 454. The version identifier field 442 may be used to specify a particular format indicate for the block associated with this head. This indicator may, for example, indicate a particular format version. The block type field 444 includes a type indicator for the type of block associated with this particular header. In this embodiment, a block type may be one of a free type, a directory block type, a control block, or a GNS data entry type or group type. In other words, a type field may be associated with each one of the different types of data that may follow the fixed header portion. In this embodiment, a particular type is associated with the control block data, a second type with a directory block, and so on. The block type designating a free block indicates that the block associated with this header is currently unused.

Included in this embodiment 440 is a flags field 446 that may include one or more flags associated with this particular header. A next block number field and a previous block number field are used in connection with multi-block entries, for example, as may be used in describing a group and its associated GNS data spanning multiple blocks. The next block number field 448 indicates the block number that comes after this current block. A zero in this next block number field 448 indicates that this current block is the last block of the current logical GNS data entry. The previous block number field 450 indicates the number of the block that comes before this current block. A zero in this field indicates that this current block is the first block of a particular logical entry as may be associated with a GNS group. The fields 448 and 450 may be used as pointers in constructing a linked list of data blocks in the instance where, for example, the GNS data of a single entry may be associated with a single group spanning more than one physical block in partition 402. The flags field 446 may be used to indicate any one or more conditions. For example, if the GNS data for a group spans multiple blocks, a flag bit may be set to indicate whether a particular block is the first of the multiple blocks. Other embodiments may include other flags than as described herein.

A block version field 452 includes a value that changes each time there is a change to the associated block. It should be noted that this field may be used in an embodiment for any one of a variety of different reasons such as, for example, to help recover from corruption. A key or name field 454 may be used to identify a group or other type of data associated with this header. In one embodiment, the key or name field 454 associated with a header for GNS data may include the GNS group name, for example, in the form of an ASCII string. The GNS group name may be included in the first data block for a group that may span multiple data blocks.

It should be noted that if a header is included in a block containing GNS data for a group in 402, the block type 444 may indicate a particular type of group. For example, in one embodiment the block type of a header associated with GNS data may indicate that this group is located on a single Symmetrix data storage system, that this group spans multiple Symmetrix data storage systems, or that this group is a mainframe group indicating that this group is valid for one or more particular types of host systems. An embodiment may define one or more other block types that may vary in accordance with each embodiment. In this embodiment, the same key value as indicated by the key or name field 454 may occur multiple times each with a different block type as indicated by field 444. This provides support for the same group name that may exist for one or more of the different block types 444.

In the embodiment described herein, each combination of a group name in 454 and group type in 444 is unique and may be used in connection with identifying a particular group. There may be one or more group types defined in accordance with possible group characteristics and/or classifications. For example, one or more group types may relate to where devices of a group may physically be located. A first group type may be associated with a group that includes devices which are defined on only a single data storage system. A second group type may be associated with a group having devices that span multiple data storage systems. Other types may be associated with other variations and characteristics that may be associated with a group.

Figure 11:
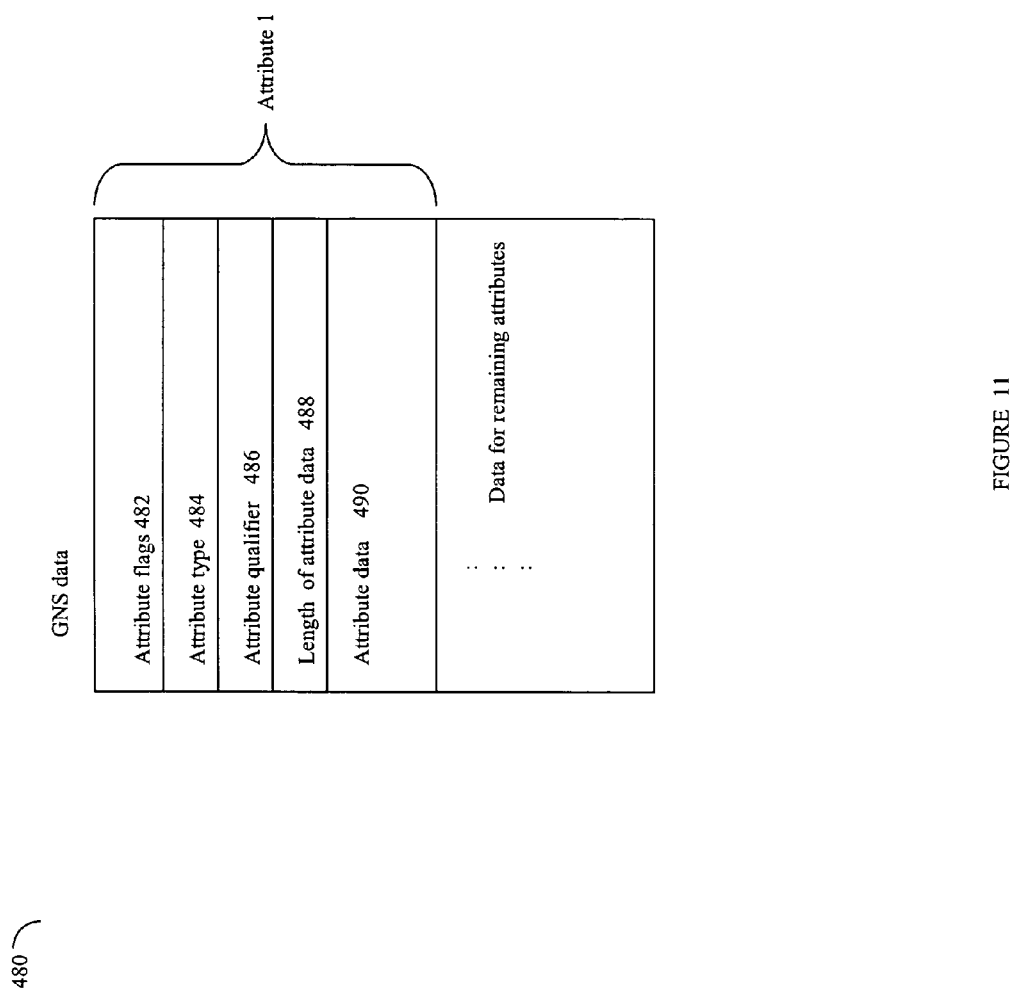
FIG. 11 is an example of an embodiment of a GNS group data portion in the group data partition.

Referring now to FIG. 11, shown is an example of an embodiment 480 of a GNS data portion of a block such as 402a. Each GNS data portion 480 includes multiple fields associated with each attribute of a group. A single GNS data portion 480 may include data associated with one or more attributes. For each attribute, a GNS data block includes an attribute flags field 482, an attribute type field 484, an attribute qualifier field 486, a length of attribute data field 488, and the attribute data 490. The attribute flags 482 includes attribute specific information associated with the particular attribute being described. The attribute type field 484 is an identifier of the particular attribute such as, for example, a list of devices, creation time, and the like. The attribute qualifier field 486 includes a qualifier describing this particular attribute as may be used to further qualify the attribute. This may correspond, for example, to a particular group identifier of other types of groups associated with a particular communications connection, such as an RDF group identifier, an RA group identifier, and the like. In this embodiment, the combination of the attribute type 484 and attribute qualifier 486 are unique for a particular attribute associated with a group. The length of attribute data field 484 specifies the number of bytes of data or the length of the attribute data field 490 that follows. The attribute data 490 includes the actual attribute data which may be, for example, a time value in a predefined time stamp format if the attribute type field 484 indicates a creation time as the attribute. The attribute data 490 may also be, for example, a list of device identifiers corresponding to devices belonging to a particular group if the attribute type in attribute type field 484 indicates that this attribute is a list of devices. These are just two examples of how the different fields of FIG. 11 may be used in connection with representing an attribute associated with a particular group. Data stored in the GNS scratch area may be stored in a format so that any host can read and interpret the data therein. The particular format may vary in accordance with each embodiment.

Referring now to FIG. 12, shown is a representation of an embodiment 500 of control block data portion that may included in partition 406 of the representation 400 previously described in FIG. 8. In this example 500, a control block data portion includes a GNS format indicator field 502, a flags field 504, a block size field 506, a Symmetrix global version number field 508, a number of blocks in GNS region field 510, a block number of the first directory block field 512, the block number of the last directory block field 514, a current number of directory entries field, 515, a maximum number of directory blocks field 516, a maximum number of GNS data blocks field 517, the size of the free map field 518, an index of the first byte within the free map 520, the free block bitmap field 522, and an end control block data field 524. It should be noted that the end control block data 524 may be some type of a unique identifier signifying the end of the control block data portion 500. This may vary in accordance with each particular embodiment.

The GNS format indicator 502 may be used in a manner similar to field 442 to indicate a specific format of a control block. The flags field 504 includes flags as may be associated with the control block data portion 500. The block size field 506 indicates as an integer value, for example, the size of each block included in the region 356b. In this embodiment as described herein, the block size selected may be 512 bytes. However other block sizes may be selected in accordance with each embodiment. The Symmetrix global version number field 508 includes a global version number which is modified or changes each time any portion of the GNS data region of this particular data storage system is modified. It should be noted that the Symmetrix global version number 508 is used by GNS daemon processes executing on the host systems as described elsewhere herein to detect when changes are made to GNS data by some other host. In one embodiment, this is 64-bit value. However, other embodiments may use different sizes in connection with this and other fields. The number of blocks in GNS region field 510 specifies the number of blocks in the GNS dedicated use region 356b as may be used in the scratch area for storing GNS data.

The block number of the first directory block field 512 may be characterized as a pointer to the first block of the directory partition 404. Similarly, the block number of the last directory block field 514 may be characterized as a pointer to the last block associated with a directory entry in the directory partition 404. In combination, the data items 512 and 514 represent pointers to the beginning and the end of the directory region or partition 404 described elsewhere herein. The fields 512 and 514 may be used, for example, in connection with reading the entire directory by providing immediate access to the beginning and end of the directory information. The current number of directory entries field 515 indicates the current number of directory entries where a single entry is associated with a particular group name. A maximum number of directory blocks 516 indicates the maximum number of directory blocks reserved for the directory partition 404. The maximum number of GNS data blocks 517 indicates that maximum number of blocks that are reserved for GNS data storage in region 356b from the scratch area.

The size of free map field 518 indicates the size in number of bytes of the free map bitmap 522. In this embodiment, the free map size is 400 bytes. A particular embodiment may select any one of a variety of different sizes for the free map in accordance with a particular embodiment. The index of the first byte in free map field 520 includes a pointer or an index of the first byte in the free map at which there may be free blocks. It should be noted that this field 520 may be maintained as an optimization for quick access to the first entry in the free map that may contain a free block. This may be used as an alternative, for example, rather than searching the free map for the first bit position indicating that a particular block is free. The free map bitmap 522 is a bitmap used in the management of the GNS data blocks in partition 402. With the bitmap 522, a particular bit position is associated with each GNS data block having a value of 0 when the block associated with this bit map entry is unused, and a value of 1 otherwise. It should be noted that in this particular embodiment, the free map bitmap 522 may be stored within the control block data itself. However, an embodiment may also store portions of the bitmap elsewhere herein such as in following data blocks in accordance with the size of the bitmap used in an embodiment.

As described herein, a directory entry exists for every GNS group stored within the area 356b. In one embodiment, a directory block may contain as many as 6 directory entries.

Referring now to FIG. 13, shown is an example of the directory entry 540 that may be associated with each particular group. Block type 542 indicates the group type corresponding to the block type 44 from FIG. 10. The directory flags 544 include one or more flags that may associated with a particular directory entry. The number of first block for group field 546 includes a pointer or a reference to the first block of GNS data associated with this particular group. The last block of the GNS data associated with this group is indicated by field 547. The Symmetrix group version number 548 includes a version number of this particular group and which is modified or changes each time there is a change to the group identified by this directory entry. In one embodiment, the field 548 may be 64 bits in size although the particular size may vary with each embodiment. The GNS group name field 550 includes an ASCII string corresponding to the group name.

By using a directory that includes the names of the defined GNS groups, the foregoing may be used to facilitate one or more supported operations that may be included in an embodiment. For example, the foregoing may be used to support an operation that lists information about a group as may be performed using an API. Storing the starting block number of each group facilitates the look up of a particular group and its associated attributes within the GNS data region 402. Storing the version number of each group in the directory makes it possible for the GNS daemon to recognize when groups have been changed on a data storage system. This version number may be used, for example, by the daemon when polling the data storage systems for updated group data. The foregoing are examples of how information included in the directory entry for each group may be used in facilitating one or more other operations that may be included in an embodiment in connection with groups as described herein. Other embodiments may include other information in the directory partition in accordance with the types of operations supported.

It should be noted that in connection with maintaining the region 356b of the scratch area used for storing GNS data, any one of a variety of different techniques may be used in connection with allocating blocks therefrom as well as maintaining the region 356b. For example, if block allocation occurs from the high address end of the region 356b, an embodiment may choose to not use a data storage compaction technique that may be characterized as similar to a defragmentation operation.

The foregoing data structures included in the scratch area of each Symmetrix data storage system in one embodiment may be used in storing and communicating GNS group data to one or more hosts.

As described herein, a single SYMAPI call that may be made from an application executing on one of the host may result in one or more requests from a lower level daemon to the data storage systems to read and/or write group data. For example, a SYMAPI call may be issued in connection with updating information about a group that spans multiple Symmetrix data storage systems. In connection with this operation, a single SYMAPI call may result in the lower layer of the daemon 106a on a host issuing multiple calls to each of one or more data storage systems.

Each daemon executing on one of the host systems is responsible for obtaining any necessary locks to perform a write operation to the scratch area including the GNS data as described herein. In one embodiment, it is generally the case that atomicity is guaranteed only for an operation on a single Symmetrix data storage system. Individual update operations per data storage system may be performed atomically by a particular GNS daemon. In one embodiment, a GNS daemon that needs to write information to a scratch area obtains a lock associated with the scratch area, or the GNS data region thereof, in the data storage system. For example, if a GNS daemon performs an update of group data for a group spanning multiple Symmetrix data storage systems, the GNS daemon obtains the lock for the scratch area of first data storage system. The daemon ensures that data communications may occur between the GNS daemon and the associated scratch area. The GNS daemon then attempts to perform the update operation on that particular scratch area such as by writing out the GNS data modifications or updates. Subsequently, the lock associated with the scratch area may be released. This process is performed in one embodiment for each of the data storage systems and associated scratch areas or GNS data regions thereof, when performing an update to GNS data on multiple Symmetrix data storage systems. As such, it is the general case in this embodiment that atomicity may not be guaranteed for each SYMAPI call that may result in multiple communications between the GNS daemon and multiple data storage systems to perform a single requested operation. In one embodiment, this may be the general procedure followed when performing an update. In the event that the daemon fails to successfully perform an update to any one of the scratch areas of multiple data storage systems for a group, the GNS daemon may attempt to back out any changes made to other scratch areas. For example, if the GNS daemon needs to perform three GNS data updates for three different data storage systems and succeeds on the first two, but fails to perform the update when writing out the data to the scratch area for the third, the GNS daemon may attempt to back out the changes from the first two scratch areas of the first two data storage systems that were previously successfully completed.

It should be noted that using the foregoing level of atomicity may cause group data spanning multiple data storage systems to be left in an inconsistent or otherwise erroneous state. This may occur in connection with performing multiple write or update operations to multiple Symmetrix data storage systems. In one embodiment, this may be performed in connection with two operations. The first operation is a rename group operation and the second operation is an update to metadata linkage information when defining a group on a data storage system for the first time. In connection with the first operation which is a rename group operation, the group's name is changed on each data storage system having devices belonging to that GNS group. In connection with this operation, a SYMAPI call may be used to perform a rename operation of a group spanning multiple data storage systems. A single SYMAPI call may cause the GNS daemon to obtain the locks on all of the associated data storage systems prior to performing any updates to any one of the data storage systems. In the case of the rename group operation, the GNS daemon: sequentially obtains the locks for all of the scratch areas or GNS data portions thereof, performs communication verification and other validation steps that the GNS daemon is able to update and access the GNS data portion of the Symmetrix scratch areas for all of the data storage systems, and then attempts to update each of the data storage system scratch areas. Each lock may be released after a particular data storage system's GNS data is updated so that no more than one area at a time is locked. In the event that any one of the update operations of the GNS data to the scratch areas fails, the GNS daemon may attempt to back-out changes on all of the other Symmetrix data storage systems in order to leave the group definition in a consistent state.

The second operation is a metadata operation used in initially storing particular group information on a data storage system. For example, suppose a first group is defined and only includes devices on a Symmetrix data storage system A. Subsequently, a device from another Symmetrix data storage system B is added to the first group. As part of the processing associated with adding this device from system B to the group, linkage information on all data storage systems for the group is updated. In one embodiment, one group attribute is a data storage group linkage attribute that includes a data storage system linkage identifier list of all Symmetrix data storage system identifiers associated with this particular group. A data storage group linkage attribute may include GNS data corresponding to the list of Symmetrix data storage system identifiers. This data storage group linkage attribute may be stored or duplicated on each of the data storage systems associated with this particular group. As a result, for each affected data storage system, the GNS daemon may obtain the scratch area lock, update the scratch area, and release the lock.

It should be noted for the foregoing two specific operations, and others described herein that may be included in an embodiment, it may not be possible for the GNS daemon to back-out the changes when a failure occurs such that group data is in what may be characterized as an inconsistent state across multiple data storage systems. In other words, the daemon may have partially updated a portion of group data as on one data storage system and be unable to both complete the update and also be unable to back-out or reverse the partial updates already performed. An embodiment may perform any one or more different processing steps at this point. The particular processing steps may also vary in accordance with each operation as well as embodiment. In one embodiment, a daemon may log the failure and attempt to complete the update one or more subsequent times. An embodiment may attempt to put the group in a consistent state by trying to back out changes at a later point in time. This may also be done by logging the initial failure and rolling back the group information as opposed to completing the group update. An embodiment may mark a group as inconsistent and limit the number of group operations or restrict the set of group operations that may be performed from this point forward leaving additional recovery steps to the user.

Figure 14:
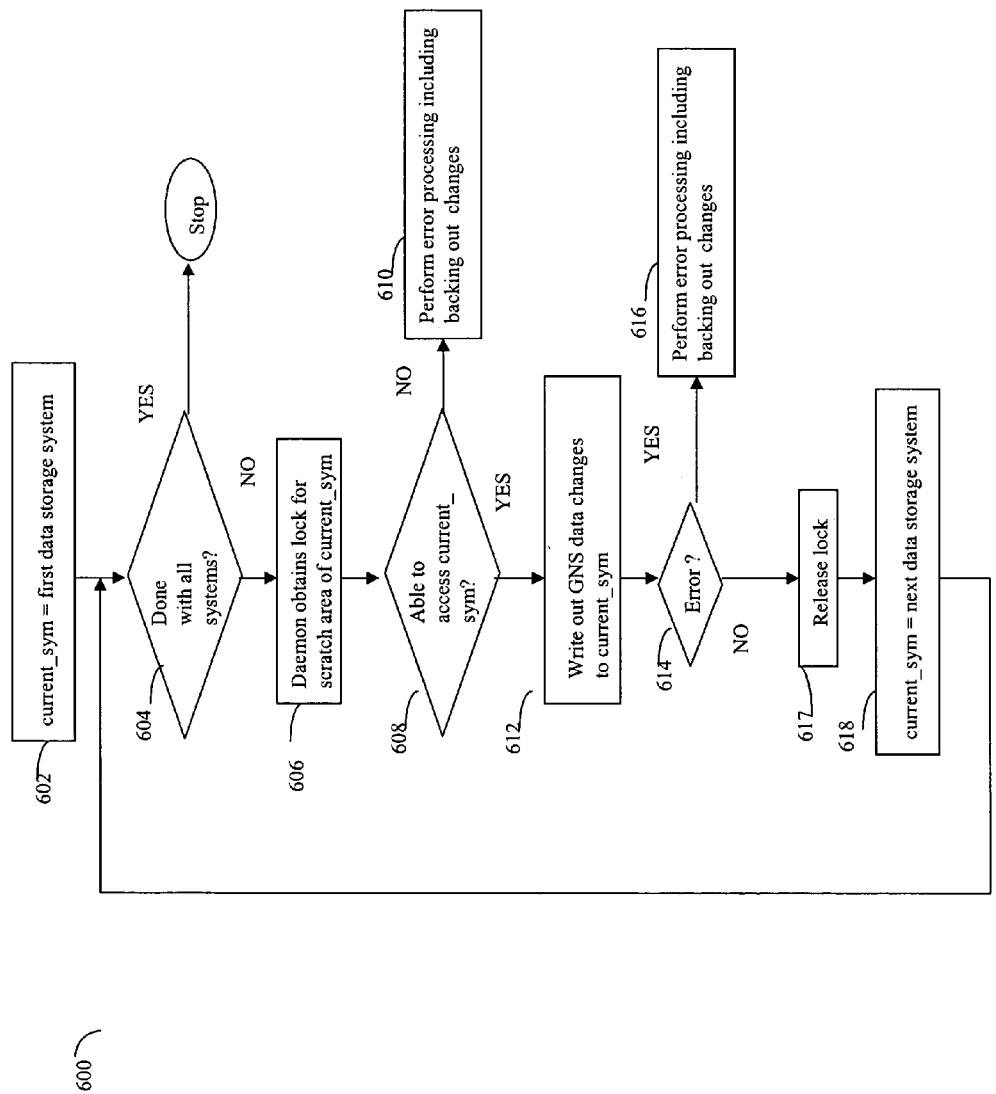
FIG. 14 is a flowchart of steps of one embodiment for writing out changes to GNS data stored on the data storage systems.

Referring now to FIG. 14, shown is a flowchart 600 of steps that may be performed in one embodiment by a GNS daemon in connection with updating one or more GNS data storage locations included in the scratch areas of Symmetrix data storage systems. Generally, the steps of flowchart 600 describe and summarize the general processing steps just described that may be used, for example, in connection with issuing multiple commands for updates to multiple data storage systems to perform an operation. At step 602, the variable current_sym is assigned the first data storage system. At step 604, a determination is made as to whether all data storage systems have been processed. If so, processing stops. Otherwise, control proceeds to step 606 where the GNS daemon of a host system obtains the lock for the scratch area of the current_sym. At step 608, a determination is made as to whether the GNS daemon is currently able to access the current_sym to perform the necessary operations for updating the scratch area. If not, control proceeds to step 610 where error processing may be performed and may include, for example, backing out changes of any other updates made to other scratch areas for this operation. The goal of step 610 may be an attempt to return a group definition spanning multiple data storage systems to a consistent state. Since a failure occurs for one of the data storage systems while others data storage system scratch areas may have been updated, an attempt is made at step 610 to back-out the updates made to the other scratch areas. At step 608, if it is determined that current_sym and associated scratch area are accessible and the GNS daemon makes a determination that it is able to perform the necessary updates to the current_sym's scratch area, control proceeds to step 612 where the GNS data changes are written out to the current_sym's scratch area for the GNS data. At step 614, a determination is made as to whether an error occurred in connection with writing out the GNS data changes at step 612. If so, control proceeds to step 616 where error processing may be performed including backing out changes as described previously in connection with step 610. At step 614, if no error has been detected in connection with writing out the GNS data changes for the current_sym, control proceeds to step 618 where the current_sym is assigned the next data storage system and control proceeds to step 604 where a determination again is made as to whether all data storage system scratch areas that need to be updated for the current operation have been updated. If it is determined at step 614 that no error has occurred in connection with writing out the GNS data changes to the current_sym's scratch area, control proceeds to step 617 where the lock is released and control then proceeds to step 618 where current_sym is assigned the next data storage system.

It should be noted that the flowchart 600 includes steps that may be performed in an embodiment as described herein where the atomicity of the data is only guaranteed for a single GNS operation on each data storage system. In other words, individual update operations are performed atomically on a single Symmetrix data storage system.

Included in this embodiment are several different types of version numbers that are maintained by the daemon as well as each of the Symmetrix data storage systems. In one embodiment, there are four types of version numbers. Two types of version numbers are maintained per each Symmetrix data storage system and two types of version numbers are maintained and used by each host daemon. A first type of version number is maintained for each group on each data storage system. In the data structures described herein, this is represented in field 548 of the directory block of a group. When there is a change made to the group data on a particular data storage system, the version number which is local to that data storage system for that particular group is modified. A second type of version number is maintained for each data storage system representing an overall view of group data associated with that data storage system. In the data structures described herein, this is represented in field 508 of the control block in 406. If a change is made to any GNS data for a data storage system, the second type of version number for that data storage system is changed. The first type of version number may be referred to herein as a Symmetrix group version number. The second type of version number may be referred to herein as a Symmetrix global version number. The first and second type of version numbers are maintained and stored on each of the Symmetrix data storage systems and applied locally to the GNS data with respect to a single Symmetrix data storage system.

The third and fourth types of version numbers are maintained with respect to each host system by the GNS daemon on a particular host system. Associated with each group is a third type of version number that may be characterized as a host group version number. When a change is made to any GNS data associated with any data storage system for a group, the group's host group version number is modified. A fourth type of version number also maintained locally by the GNS daemon for a host is a host global version number which is modified if there has been any change to any GNS data in any group for any data storage system. To summarize, the host version numbers, the third and fourth type of version numbers, apply to, or span, multiple data storage systems if that particular group spans multiple data storage systems. The first and second type of version numbers, the Symmetrix version numbers, are maintained per data storage system and only apply to each data storage system.

The third and fourth type of version numbers as maintained by the GNS daemon on a host system may be used in an embodiment to determine when a GNS data modification has been made to a group. One use for these host version numbers is described in following paragraphs. In one embodiment, the first and second types of version numbers may be used within the GNS daemon. The third and fourth types of version numbers may be made visible for use by applications and other clients using GNS services. An application may use the third and fourth version numbers to detect when a host's daemon has detected a change to a GNS group. For example, the fourth version number tells an application that some GNS data change has occurred. The third version number for each group may be used to indicate to the application which particular group's GNS data has changed so that the application may reload its cache with the updated GNS data for each modified group. An application may use the third and fourth version numbers, for example, in connection with polling the daemon for group changes.

In one embodiment, local clients on a host system may use the third and fourth version numbers in processing. When a session is initialized, for example, session-local context information may be maintained or cached in memory. This session-local context information may include a copy of the group data and information about the GNS data, such as the host version numbers, when GNS is enabled. While the session is active, the GNS daemon may then refresh the group data included in the session-local context information with any updates as acquired by the GNS daemon. This automatic update by the GNS daemon posting any revised GNS data to the session-local copy may occur until the session performs a modification to GNS data. The session may be in a mode in which the GNS data modifications are made only to the session-local GNS data. At some later point, a session may attempt to write its updated session-local group data changes to one or more scratch areas of the data storage systems. Prior to writing out the modified GNS data, the GNS daemon may perform processing steps to compare one or more host version numbers associated with the locally cached GNS data with current host version numbers to determine if there have been any intervening GNS data modifications to the global copy of the GNS data as maintained on each of the data storage systems. Processing steps using the host version numbers are described in following paragraphs using type three and type four version identifiers.

Figure 15:
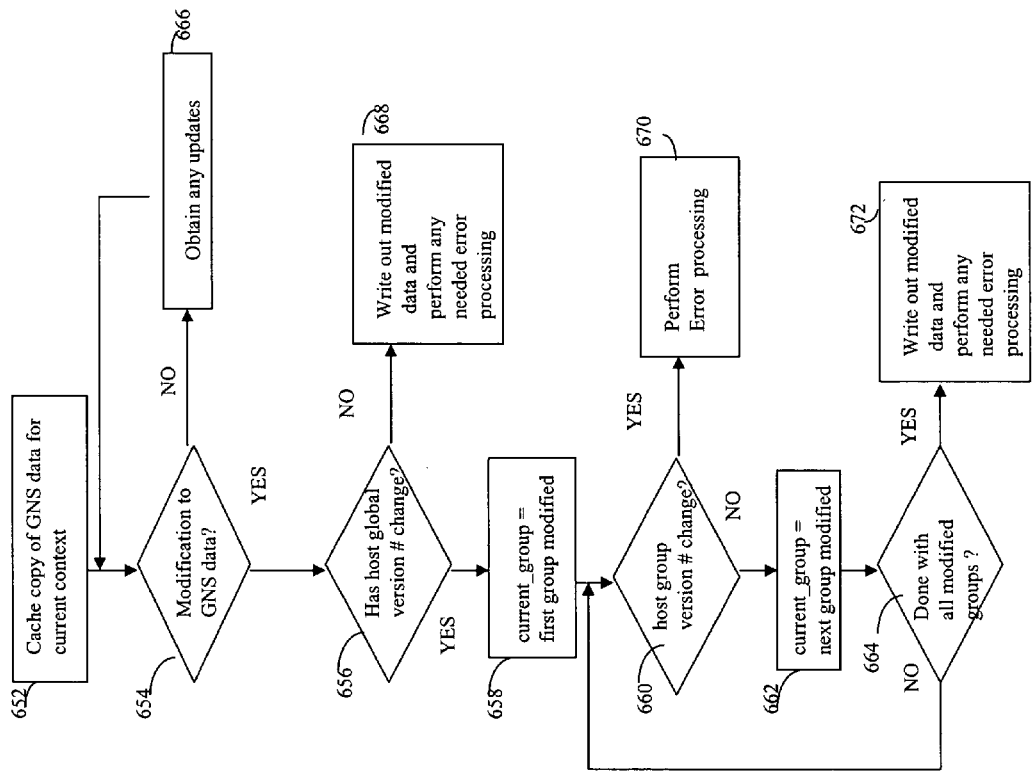
FIG. 15 is a flowchart of steps of one embodiment for writing out changes to GNS data stored on the data storage systems using version numbers.

Referring now to FIG. 15, shown is a flowchart 650 of steps that may be performed in one embodiment in connection with using the forgoing type three and type four version identifiers to write out GNS data changes. As an example, a local client may perform the processing steps of flowchart 650 prior to writing out GNS data updates which may be cached locally. At step 652, a copy of GNS data as may be included in a session-local copy of session context data is obtained. As described above, this may be performed, for example, as part of initialization of a session. At step 654, a determination is made as to whether any modifications have been made during the current session to the GNS data included in the session-local GNS data that may be cached in memory. If not, control proceeds to step 666 where any updates to the global GNS data as obtained by the GNS daemon are also applied to the current cache copy. The processing at steps 654 and 666 keeps the session-local copy of the cached GNS data up to date until a modification to the session-local copy of the GNS data for the particular context is made by the session. An embodiment may optionally not include functionality associated with steps 654 and 666. When the session has modified the session-local copy of the GNS data, the automatic updates to the session-local copy of GNS data stops. At some point later after one or more modifications to the session-local GNS data have been made, control proceeds to step 656 for further processing when the current session desires to write out the data modifications as reflected in the session-local GNS data to the data storage systems. At step 656, a determination is made as to whether the host global version number as maintained by the GNS daemon has been changed. In connection with step 656 processing, a comparison is made between the host global version number associated with the session-local copy of GNS data, and the current value of the host global version number as maintained as part of state information for the entire host system with respect to all data storage systems and all GNS groups. If the host global version number has not been modified, any data updates may be written out. The necessary error processing associated with any failures to write out the GNS data changes may also be performed. It should also be noted that included in step 668 processing is obtaining any one or more locks needed to update one or more scratch areas in accordance with particular GNS data modifications.

If, at step 656, it is been determined that the host global version number has changed, it indicates that at least one portion of the GNS data for one group has been modified. Processing then continues with step 658 to determine which host group number version has changed. It should be noted that the host global version number used at step 656 is the type four version number as described elsewhere herein. Associated with each group is a host group version number that is the third type of version number described above. At step 658, the current group variable is assigned the first group that has been modified in accordance with the modifications to the session-local copy of the GNS data. At step 660, a determination is made as to whether the host group version number for the current group has changed. If so, control proceeds to step 670 where error processing may be performed and the modifications to the GNS data are not written out. In other words, it has been determined at step 660 when control proceeds to step 670 that the current session has modified a version of GNS data which is now outdated due to another process updating the global copy of GNS data for that same group. If, at step 660, it is determined that the host group version number has not changed, control proceeds to step 662 where the variable current group is assigned the next group that has GNS data modifications to be written out to the data storage system(s). At step 664, a determination is made as to whether all modified groups have been checked with step 660 processing for the host group version numbers. If so, control proceeds to step 672 where the updated GNS data modifications may be written out. This may be performed by the host daemon writing modifications out to each data storage system's scratch area as needed in accordance with the modifications. Processing at step 672 is similar to that processing as described at step 668 and includes, for example, obtaining any locks and performing any necessary error processing in connection with any failures to write out the modified GNS data to the one or more data storage systems. If, at step 664, it is determined that all of the groups having modifications have not been tested, control proceeds to step 660 where a determination again is made as to whether, for the current group, there has been a modification to the host group data in accordance with the host group version number. The processing continues until one of two conditions is determined: the current set of changes by the current session is not able to be written out because of an intervening change to global GNS data by another session, or the current set of changes by the current session may be written out because there has been no intervening global GNS data modification.

As described above, a session-local copy of the GNS data may be continuously refreshed and reloaded as the GNS daemon detects any GNS data modifications made to the global copy. This refreshing process may continue until the session modifies its session-local copy of the group data. Once such a session-local modification is made, the refreshing of the session-local copy of GNS data stops. The executing session may make one or more modifications to the session-local copy of the GNS data. This allows a session to queue up multiple changes to the GNS data. Subsequently, the current session may decide to write out the session-local GNS data changes to one or more scratch areas as maintained by one or more data storage systems. At this point, a comparison is made with particular version numbers as described in connection with flowchart 650 FIG. 15 processing to determine if the GNS data modifications as maintained in the session-local copy may be transmitted and written out to the GNS repository of each data storage system.

It should also be noted that the locks associated with the scratch areas described herein may be implemented using any one or more techniques known to those in the art in accordance with the particular locking mechanisms that may be included in an embodiment. For example, an embodiment may use a locking technique available on each data storage system to synchronize access to the data storage system's data areas.

Figure 16:
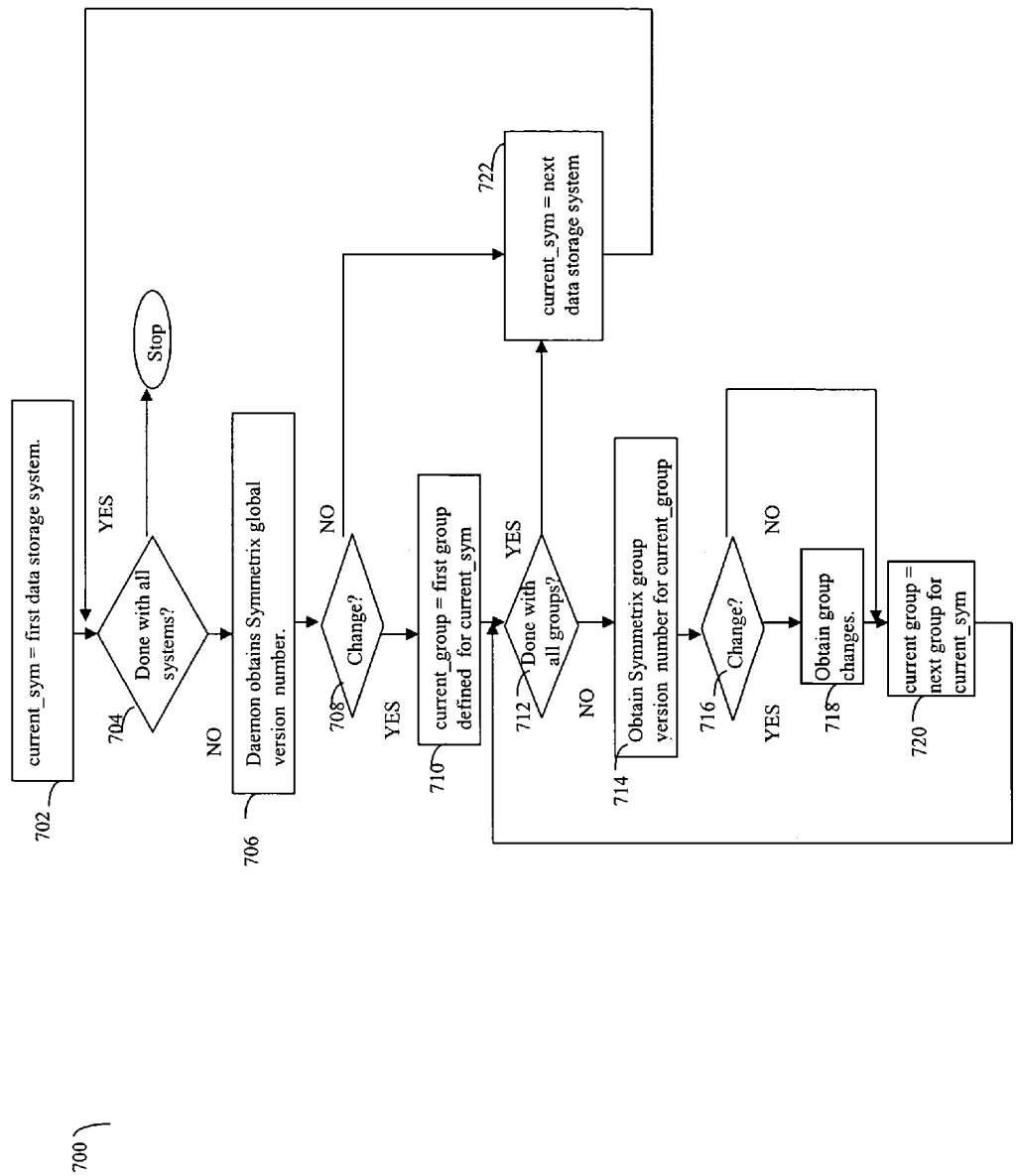
FIG. 16 is a flowchart of steps of one embodiment for obtaining updated group information using version numbers.

Referring now to FIG. 16, shown is a flowchart 700 of steps that may be performed by a GNS daemon as included on one or more host systems in connection with polling data storage systems to obtain updated group information. The flowchart 700 includes processing steps which may be included in one embodiment using the Symmetrix version numbers as described elsewhere herein. The first and second types of version numbers, described elsewhere herein, may be used in determining whether there has been an update by a remote host to GNS data cached by the GNS daemon. The steps of flowchart 700 are more detailed steps of one embodiment for performing the polling process as described previously in connection with flowchart 300 of FIG. 6.

At step 702, a variable current_sym is assigned the first data storage system. At step 704, a determination is made as to whether all data storage systems have been polled. If so, processing stops. Otherwise, control proceeds to step 706 where the daemon obtains a Symmetrix global version number. As described elsewhere herein, the Symmetrix global version number refers to a version number that is maintained one per data storage system and is changed if there is a GNS data update to any group information for that Symmetrix. If at step 708 the daemon determines that there has been a change in the Symmetrix global version number for the current sym, control proceeds to 710. Otherwise, control proceeds to step 722 where the variable current_sym is assigned the next data storage system. The daemon maintains a current value of the Symmetrix global version number in accordance with the GNS data known to the daemon on the local host system. If the version as maintained by the daemon on the local host system does not correspond to the Symmetrix global version number obtained from the Symmetrix data storage system, it indicates that a change has occurred since the daemon last updated its host-copy of the GNS or group data. Accordingly, if it is determined that there has been a change to the Symmetrix GNS data, processing continues to determine which particular group or groups have had modifications to its GNS data. At step 710, a variable current_group is assigned the first group defined for the current_sym. At step 712, a determination is made as to whether all of the groups for the current Symmetrix data storage system have been processed. If so, control proceeds to step 722 where processing continues with the next Symmetrix data storage system. Otherwise, processing continues at step 714 for the current group of the current data storage system. At step 714, the Symmetrix group version number for the current_group is obtained. At step 716, a determination is made by the daemon as to whether there has been a change with respect to the Symmetrix group version number for the current group. This may be done in a manner similar to that as described at step 708 by comparing two version numbers where a first version number is maintained by the daemon corresponding to GNS data on the particular host and a second version number corresponds to the version of the group data as currently residing on the current data storage system, current_sym. If there has been a change, control proceeds to step 718 where the group changes are obtained by the daemon and the host's copy of the GNS data is updated. Otherwise, if a change is not detected, control proceeds to step 720 where the current group variable is assigned the next group for the current_sym. Processing continues at step 712 until all of the groups have been processed for the current_sym. The foregoing processing continues for all of the groups within each of the data storage systems until all changes have been obtained by the daemon.

The processing steps of flowchart 700 may be performed at different polling intervals, for example, once every minute or other predefined interval in accordance with each particular embodiment. Additionally, it should be noted that, as described elsewhere herein, the steps of flowchart 700 may be performed in accordance with other notification mechanisms signaling the daemon to obtain updated GNS data from the data storage systems.

As described herein, the foregoing techniques may be used in connection with reading and/or writing GNS group data from one or more data storage systems. An embodiment may include support for performing operations using GNS data on a data storage system including, for example, adding and deleting a device from a group, obtaining the status of one or more devices in a group, obtaining one or more attributes about one or more devices in a group, adding, modifying or deleting a particular attribute associated with a device and/or a group, naming a group, and the like. As described herein, attributes that may be associated with a group may be either non-data storage specific attributes or data storage specific attributes. For non-data storage specific attributes, a particular attribute may occur only once within the group. For data storage specific attributes associated with a group, an attribute may occur once per data storage system within a group. Non-data storage specific attributes, such as create date/time, may be duplicated on each data storage system that the group resides on such that the attribute is logically defined once, but may exist physically on multiple data storage systems.

In one embodiment, a group generation number may be used in connection with the techniques described herein. When a group is created, a generation number is associated with a particular group. In one embodiment, the generation number may be a random number stored in the GNS data as an attribute. It may be a hidden attribute in that, for example, it may never been returned or displayed to a user, but is rather available only for internal processing and is never published. Using the techniques described herein, there exists the possibility that different groups may be created with the same name. The generation number may be used as a secondary piece of data to distinguish between two groups having the same name. In a general operation of one embodiment, a GNS daemon may not allow two groups to be created with the same name. For example, when a command is issued to define a new group, a daemon may disallow creation of the new group if there is already an existing group with the same name. However, there are instances when two different groups having the same name may come into being.

In a first scenario, a data storage system containing existing group definitions may be made visible to a GNS daemon host. This may occur, for example, when a Symmetrix data storage system is being powered up and brought back on line. A first data storage system may have a GROUP 1 definition. The first data storage system may then crash and be brought off line. While the first data storage system is off line and being repaired, a second Symmetrix data storage system which is currently on line may also have a new GROUP1 created. The daemon detects no conflict because there is no existing GROUP1 definition. When the first Symmetrix data storage system is then brought back on line, the GNS daemon host then sees two different groups with the same name.

In a second scenario, two different GNS daemons may attempt to create groups with the same name on different Symmetrix data storage systems at the same time. Both of these GNS daemons may succeed. Although each GNS daemon may eventually determine the conflict that the same group name has been used on multiple data storage systems, asynchronous delays due to events and polling between each data storage system and its associated daemon may cause this recognition to come too late. As a result, two different successfully created groups, each created by a different daemon, may have the same name.

The generation number may be used in these first and second scenarios to distinguish between these two groups having the same name that may come into being. A unique generation number may be associated with each group that is created. In this manner, even if two groups have the same name, each group has a different generation number. In one embodiment, a random number may be used in connection with selecting a generation number. However, an embodiment may use other techniques in selecting a generation number uniquely associated with each group when created. When a daemon decides to add a new data storage system to an existing group, such as expanding a group definition from a single data storage system to multiple data storage systems, the daemon propagates the existing generation number for that group to the group definition on the new data storage system. If a GNS daemon determines that the two groups have a same name and a same generation number on different data storage systems, this indicates that the same group spans multiple data storage systems. If the group name is the same but the generation numbers differ for two groups, the GNS daemon determines that the two groups are different.

Described elsewhere herein is a data storage system group linkage attribute that includes the names or identifiers of the data storage systems belonging to that particular group. In one embodiment, this attribute may be used in connection with detection of incomplete or inconsistent groups. For example, if the daemon encounters a group which is supposed to span four data storage systems but only three data storage systems may be seen by a daemon, that group may be in an unknown or inconsistent state. This information of the inconsistent state may be detected by the daemon and displayed, for example, to a user in connection with information returned as with a SYMAPI call.

In connection with the foregoing data storage group linkage information and attribute for the data storage systems, when a daemon is requested to add a new data storage system to an existing group, the daemon may first attempt to update this linkage on existing data storage systems currently belonging to the group. In other words, data storage systems already in the group may be modified to add the new data storage system. If this update is unsuccessful, the operation fails and the daemon may attempt to back out the linkage changes that it was able to make. Alternatively, an embodiment may attempt to add the group definition to the new data storage system before updating other data storage systems to include the new data storage system in the attribute. Similar problems may occur when a daemon attempts to remove a data storage system from a group. The foregoing may result in the group linkage information as indicated by the attribute described above being left in an inconsistent state. The foregoing linkage data may be used in an embodiment as a hint regarding the state (inconsistent or not) of the GNS data for a group. To determine which data storage systems have devices belonging to a particular group, the actual group name and generation numbers maintained on the data storage systems may be used. If the linkage data is in an inconsistent state or disagrees with the group name and generation numbers as may be maintained on the data storage systems, the group name and generation numbers may be used as the primary source in determining the actual state of a group and its memberships. The linkage data may be used, for example, in performing validation processing and/or consistency processing steps described elsewhere herein. It should be noted that an embodiment may also determine that a group in an inconsistent state is determined to be an error.

It should be noted that the foregoing generation numbers may be used in connection with handling a group left in an inconsistent state, for example, when a linkage information update across multiple data storage systems fails and the daemon is unable to back-out group changes. As an example, original group information may be:

| SYM 1 | GROUPA | GENERATION # NUM 1 | LINKAGE: none |
|---|---|---|---|

In this instance, a group may be partially updated so that group name information may be:

| SYM1 | GROUPA | GENERATION # NUM 1 | LINKAGE: SYM1 |
|---|---|---|---|
| SYM2 | GROUPA | GENERATION # NUM 1 | LINKAGE: SYM1, SYM2 |

In the foregoing, the group linkage data may also be detected as inconsistent. However, processing may detect that the generation numbers are the same indicating that these two are really data about the same group. Upon detecting such a state, processing may be performed to make all group data consistent, for example to repair SYM1's linkage to include a reference to SYM2. As also described elsewhere herein, an embodiment may also mark the data as inconsistent and limit the operations that may be done to an inconsistent group rather than automatically perform processing to place the group in a consistent state.

What will now be described are processing steps that may be performed in an embodiment in connection with validation processing. Such processing may be performed, for example, after a daemon obtains updated group data or at other processing points in an embodiment.

Figure 17:
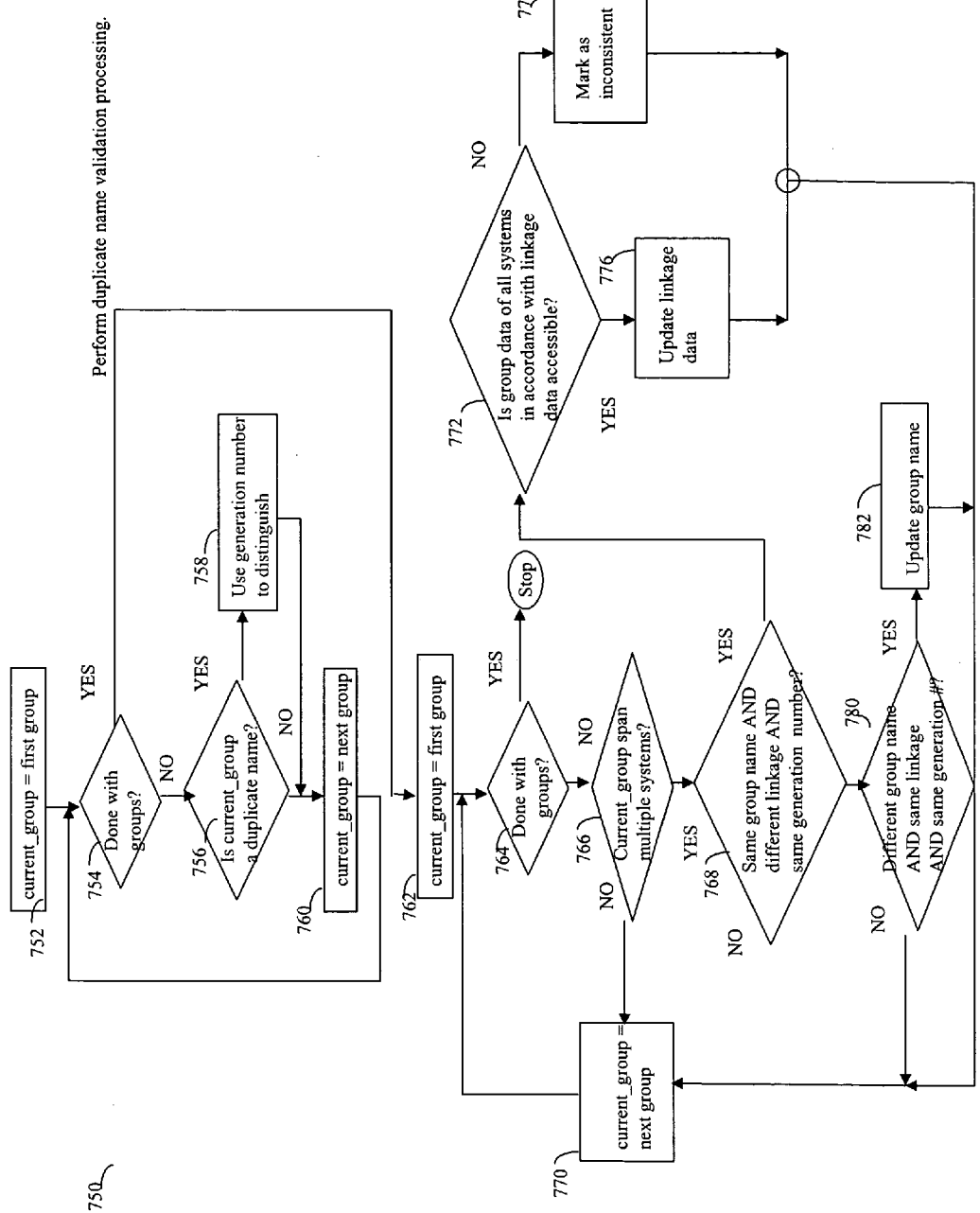
FIG. 17 is a flowchart of steps of one embodiment for performing validation processing.

Referring now to FIG. 17, shown is a flowchart of validation processing steps that may be performed in an embodiment. In the following processing steps, an embodiment may perform duplicate name validation processing, and cross-data storage system group linkage validation processing. At step 752, the variable current_group is assigned the first group. At step 754, a determination is made as to whether all groups have been processed. If so control proceeds to step 762. Otherwise, control proceeds to step 756 where a determination is made as to whether the current_group is a duplicate name with respect to any one or more other group names. If so, control proceeds to step 758 where all group having the same name may be extracted from the list of groups. The generation number associated with each group may be used in determining which groups span multiple data storage systems and distinguishing between duplicate groups. As described elsewhere herein, groups with the same name and generation number may be determined to be the same group spanning multiple data storage systems. Groups having the same name with different generation numbers may be determined as being duplicate groups with the same name. In one embodiment, a duplicate group name, for example, may be updated to include as a suffix the generation number which is unique for each group. Other embodiments may use other ways to distinguish between duplicate group names. An embodiment may also mark the groups as duplicates and/or return an error and/or limit any subsequent operations for these groups. Control proceeds to step 760 where the next unvisited group is examined. If it is determined at step 756 that there are no duplicate names for the current_group, control proceeds to step 760. The foregoing processing steps may be associated with duplicate name validation processing and duplicity of group names may be determined by two or more sets of group data from two different data storage systems having the same name, but different generation numbers. In one embodiment, once a group name has been examined, it may be marked as "visited".

Once the foregoing is performed for all groups as determined at step 754, control proceeds to step 762 for cross-data storage system group linkage validation processing. At step 762, the variable current_group is assigned the first group. At step 764, a determination is made as to whether all group have been processed. If so, processing stops. Otherwise, control proceeds to step 766 where a determination is made as to whether the current_group spans multiple data storage systems. As part of step 766 processing, the data storage systems associated with a current_group may be determined as all data storage systems including group data having the same generation number as that of the current_group. If it is determined at step 766 that the current group does not span multiple data storage systems, control proceeds to step 770 to examine the next group. Otherwise, control proceeds to step 768 where a determination is made as to whether the current group data for the multiple data storage systems identified at step 766 indicates a common group name and generation number, but one or more of the group data sets as maintained on multiple data storage systems includes different or inconsistent linkage information. If so, control proceeds to step 772 where a determination is made as to whether group data from all data storage systems as indicated in the linkage data is accessible. Step 772 is determining if, for the current group, all the data storage systems having devices in that group are available for update. If so, control proceeds to step 776 where the linkage data on each data storage system is updated to be consistent such that each data storage system includes linkage data indicating the same data storage systems. Control then proceeds to step 770. Otherwise, if at step 772 it is determined that all data storage systems are not accessible, control proceeds to step 774 where the group is marked as inconsistent and control proceeds to step 770.

If, at step 768, it is determined that group data on each of the data storage systems for the current group spanning multiple data storage systems as determined at step 766 does not indicate the same name and generation with inconsistent linkage data, control proceeds to step 780. At step 780, a determination is made as to whether each set of group data from each of the multiple data storage systems identified at step 766 indicates the same generation number and the same linkage data, but and a different group name. If so, control proceeds to step 782 where the group name may be updated to be the same for all sets of group data. In connection with performing processing of step 782, any one of a variety of different steps may be performed in an embodiment. For example, an embodiment may select one of the groups at random to be used as the template or master which is copied to all other groups by the same name. Control proceeds to step 770. Control returns to step 764 after step 770 where processing continues until all groups, for each unique generation number, have been processed.

It should be noted that step 780 processing may be used to detect the condition of a failed rename operation for which the daemon was unable to complete and also unable to back out group changes made prior to the failure. An embodiment may also perform other processing at steps 758, 782 and 776 in accordance with how an embodiment chooses to handle the inconsistencies once detected. The foregoing processing makes an attempt to detect and make a modification where. Other embodiments may mark the states as inconsistent, and limit subsequent group data operations that may be performed to, for example, deleting a group.

It should be noted that an embodiment may use any one or more different techniques in connection with the four types of generation numbers described herein. In one embodiment, each of the different types of version numbers may be modified with respect to a previous version number whenever a corresponding group data change is made in accordance with the type of version number.

What will now be described is the use of random numbers in one embodiment having the four types of version numbers as described elsewhere herein. Whenever a change is made to group data on a Symmetrix, the corresponding Symmetrix group version number and Symmetrix global version number may be set to a random number. The host group version number may be determined using the random numbers from each of the Symmetrix group version numbers (version numbers for the same group as maintained on each Symmetrix data storage system). In one embodiment, the host group version number for each group may be formed by logically XORing (addition modulo 2) all the Symmetrix group version numbers for that group. Similarly, the host global version number may be determined by logically XORing all the Symmetrix global version numbers from each data storage system available to the daemon. Using the random number approach, an embodiment may use a pseudo-random number generator or crypto-graphic random number generator able to generate a large sequence of random numbers without repetition to guarantee the degree of uniqueness for each new version number used. It should be noted that the foregoing technique allows for each host to produce the same host global version number and host group version numbers. Other embodiments may use other techniques in connection with implementing version numbers than as described herein. It should be noted that in one embodiment, each of the version numbers may be 64 bits in length. However, an embodiment may use other sizes for these and other fields described herein.

In one embodiment using the techniques described herein, a GNS client, such as an application executing on a host, may perform a modification operation to a group and may supply an expected host group version number corresponding to the group data upon which the application is modifying. This host group version number may also correspond or differ from the host group version number corresponding to that of the host's local in-memory cache. If the version number of the actual host group version number differs from that of the application, or that version number corresponding to the in memory cache of the host, the group data has been modified by another process since the application and host obtained a copy of the GNS data. The modification operation as performed by the application may fail, for example, with a 'mismatched group version#' error. This error may indicate to the application that the group is not in the state as expected by the application. In one embodiment, the application may first obtain a refreshed copy, via the GNS daemon, of the appropriate group data prior to making a modification to the group data. Alternatively, the application may supply a value to the GNS daemon indicating whether the foregoing host group version number checking should be omitted. The application may process the mismatched group version error in any one of a variety of different ways. In one embodiment, the application may update its GNS data and try to apply the modification. In some instances, the application may report the error to a user and have a user assist in subsequent processing.

In one embodiment, the GNS daemon caches group information including, for each group, the Symmetrix group version numbers which may be logically XOR'd to form the host group version number as described elsewhere herein. The host group version number may be supplied with the application's update request and compared against the GNS daemon's host group version number. If these differ, the daemon rejects the application's modification operation since the application's copy of the group data is out of date. If the host group version numbers do not differ, the GNS daemon attempts to update each data storage system's scratch area effected by the modification operation. While doing this per-data storage system update using the locking technique described elsewhere herein, the GNS daemon compares its cached Symmetrix group version with what is actually stored on each data storage system. If the Symmetrix group version numbers agree, the update of the GNS data on that data storage system succeeds and fails otherwise. In the event of a failure, the GNS daemon may determine that its in-memory cache is out of date, and then refresh its in-memory cache causing the host group version number to change and also disagree with the application's supplied host group version number. The application's request may then be rejected. Other embodiments may perform other processing in connection with use of the version numbers described herein. It should be noted that an embodiment may serialize access to the Symmetrix group version numbers using a lock or other technique that may be included in an embodiment.

What will now be described is an alternate embodiment that may operate in accordance with a variation of the foregoing description. In this alternate embodiment, each of the host systems does not maintain a local cache copy of the GNS data. Thus, the host may operate without using the host local and host global GNS version numbers described in preceding paragraphs. Rather, as described in following paragraphs, the host may obtain a fresh copy of portions of GNS data as needed in accordance with a GNS operation in response to the request to perform the operation.

Figure 18:
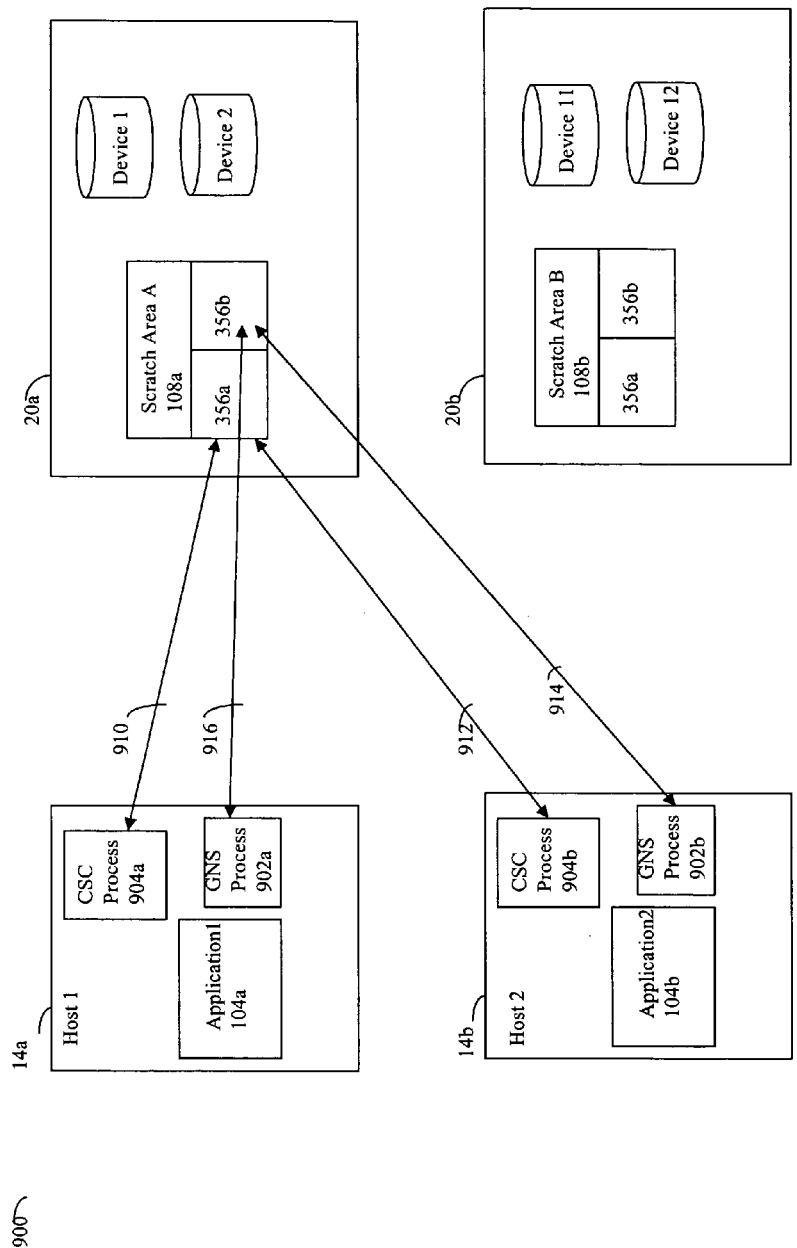
FIG. 18 is an example of another embodiment of components that may be included in the computer system of FIG. 1.

Referring now to FIG. 18, shown is an example 900 of an alternate embodiment of components that may be included in the computer system 10 of FIG. 1. The components included in the example 900 include a host system 14a and a second host system 14b with two data storage systems 20a and 20b. These components, and some other components included in 900, have element numbers as previously shown and described in connection with FIG. 3. The particular components shown in the example 900 are for purposes of illustration of the techniques of the alternate embodiment and should not be construed as a limitation.

In connection with the example 900 as part of a host's GNS startup code, each host may register itself in accordance with a particular role or user of GNS data. In this embodiment, the host may register itself as a listener for GNS data changes or updates as may be made to the GNS data stored on each of the data storage systems. As part of this registration process, the host may store host local state information indicating that the host is a registered "listener" of GNS data events. Each host system may communicate that there has been a change to the GNS data using a cross systems communication (CSC) area within the scratch area maintained on each data storage system. When a modification is made by a host to the GNS data of a data storage system, the host also writes a signal or event record to the CSC area indicating that a change has been made to that particular data storage system's GNS data. Other hosts may periodically poll the CSC area of each data storage system for these signal records as an indication of when a change has been made to the data storage system's GNS data.

Each data storage system, such as 20a and 20b, include a cross systems communication (CSC) area on each of the data storage systems. In one embodiment, the CSC area for each data storage system may be maintained in the area 356a as described elsewhere herein in connection with FIG. 7.

In one embodiment, each host, such as host 14a, may include a CSC process 904a and a GNS process 902a. The CSC process 904a may periodically poll the CSC area of each of the data storage systems for the presence of GNS event records indicating that a change has occurred to the GNS data. When such a record is read by the CSC process 904a, the CSC process 904a may post a message or signal to the GNS process 902a and any other registered listeners of GNS data events. The GNS process 902a may then access the GNS data on the particular host directly to obtain the revised GNS data. The host may wish to monitor changes in GNS data as may be used, for example, when performing particular GNS data operations described elsewhere herein.

In this alternate embodiment, a local cache copy of GNS data is not maintained on each host for use in connection with GNS commands and/or operations. Rather, in this embodiment, a copy of GNS data is obtained in accordance with the particular operation or command when issued. For example, when an application, such as application 1, performs a GNS operation requiring a read and/or write of the GNS data as may be stored on one or more data storage systems, the GNS process on that particular host obtains a copy of the needed GNS data at that particular time from each of the data storage systems' GNS data area.

The GNS process in this embodiment handles processing steps in connection with reading and/or writing the GNS data from each data storage system. The GNS process on each host may also interface via an API to an application or other process performing GNS data operations and commands. For example, in one embodiment, an application, such as application 1, may issue a command to modify GNS data of a particular group. The application may issue such a request using an API to the GNS process. The GNS process then issues requests to each of the data storage systems to read the corresponding group information from each data storage system, update the group information, and write the updated GNS data to each data storage system. The GNS data for one or more groups may be read from each data storage system by examining the GNS data. For example, if a GNS data operation is performed to GNS data for a particular group, the GNS process may first read the directory information, as maintained in 404 of FIG. 8. From this information, a GNS process may read the one or more particular sets of GNS group data of interest for the particular command.

What will now be described is a particular example illustrating how updates to GNS data may be made and communicated to other hosts. Referring again to FIG. 18, host 2 may update the area 356b of the GNS data on the first data storage system 20a as illustrated by arrow 914. The GNS process 902b notifies the CSC process 904b that such an update has been made to the GNS data and the CSC process 904b posts a corresponding event record to the CSC area 356a of the first data storage system 20a as illustrated by arrow 912. The CSC process 904a of host 1 may perform periodic polling of the CSC areas of each of the data storage systems for GNS record changes as indicated by arrow 910. The CSC process 904a posts the GNS data change event to all listeners in accordance with registration information as maintained on host 1. This causes GNS process 902a to be notified and the process GNS 902a may obtain the GNS data changes as illustrated by arrow 916.

Figure 19:
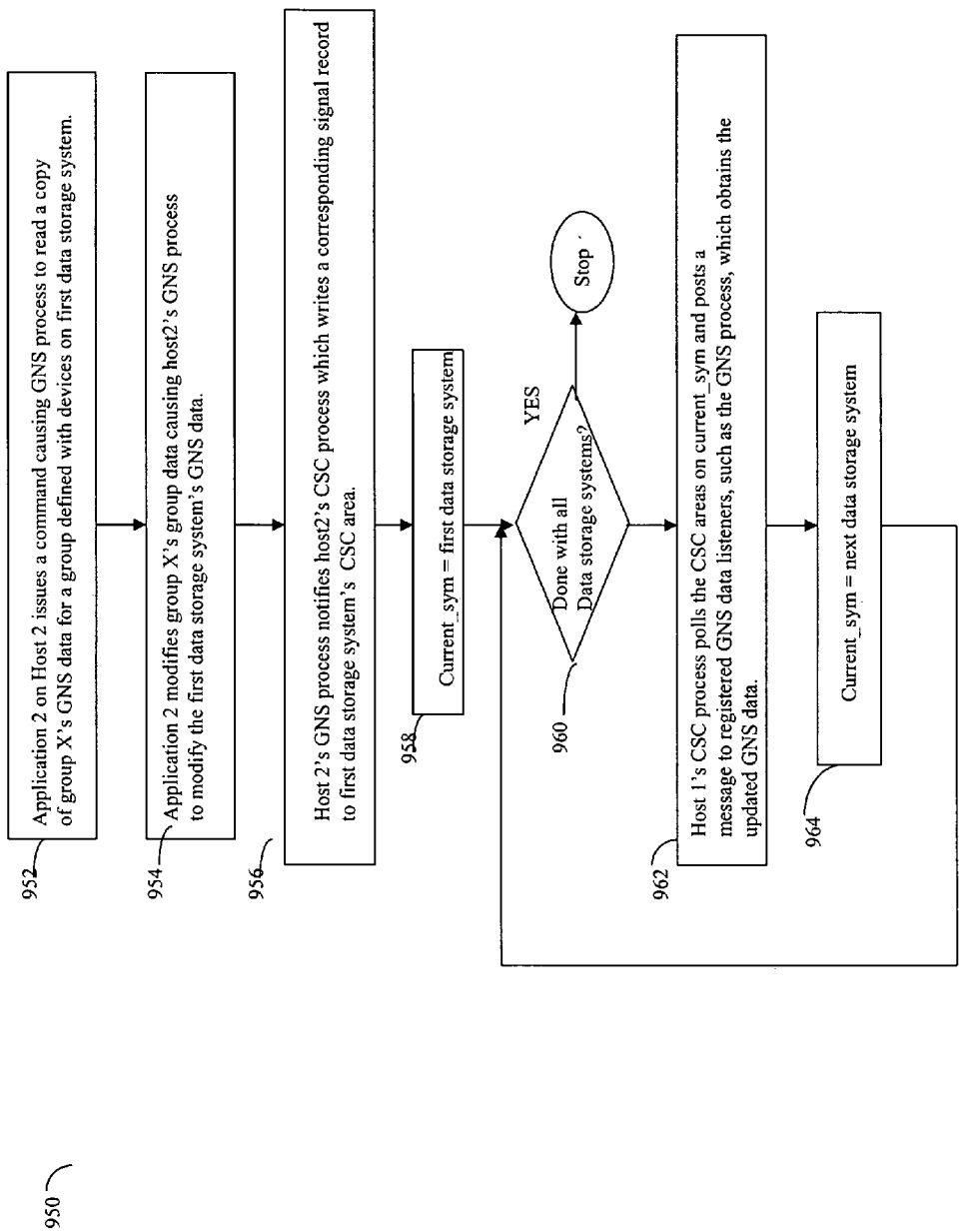
FIG. 19 is a flowchart of steps of one embodiment for modifying GNS data and communicating the change to other hosts.

Referring now to FIG. 19, shown is a flowchart of processing steps that may be performed in the alternate embodiment in connection with modifying GNS data and communicating this change to other hosts. The flowchart 950 is an example summarizing the processing steps just described with reference to components of FIG. 18. At step 952, application 2 on host 2 issues a GNS command to read group X's GNS data. The GNS process obtains the GNS data for group X from the first data storage system since group X only includes devices from the first data storage system. In this example, the GNS data for group X is for a group having devices only from the first data storage system. However, as described elsewhere herein, the group data may include devices from multiple data storage systems and, hence, multiple sets of group data from each of the data storage systems may be read in connection with a single command as also described elsewhere herein. Prior to performing a read and/or write operation in this embodiment for GNS data, a lock is obtained for the GNS data on each data storage system as accessed. Each lock may then be released as soon as each individual data storage system's GNS data is read and/or written. At step 954, the application 2 modifies the GNS data for group X causing the host 2's GNS process to update the GNS data on the first data storage system. It should be noted that, as described elsewhere herein, the GNS process may first determine if the scratch areas of all hosts are accessible prior to updating any single data storage system's GNS data. At step 956, the CSC process of host 2 then posts an event record to the CSC area of data storage system 1 in accordance with the GNS data update of step 954. At step 958, host 1's CSC process begins polling each of the CSC areas of each data storage system for event change records beginning with the first data storage system. At step 960, a determination is made as to whether all data storage systems have been polled. If so, processing stops. Otherwise, control proceeds to step 962 where the CSC of host 1 examines the CSC area of the current_sym for event records indicating GNS data updates have been made by other hosts and accordingly posts messages to GNS listeners for any indicated GNS data changes. In response to such notification, the listeners, such as the registered GNS process of host 1, obtains the GNS changes. At step 964, processing continues with the next data storage system and control proceeds to step 960.

It should be noted that the GNS process on a host may obtain changes from one or more of the data storage systems using the polling technique just described, in connection with responding to a particular request or command, or other operation in a particular embodiment. An embodiment may initialize and set up the scratch area for the CSC and/or GNS data for each data storage system as part of GNS startup processing initiated by a host. An embodiment may lock one or both the CSC and GNS data areas as needed in accordance with performing initialization processing and other operations as described herein in order to ensure proper synchronization and access to the data areas when accessed by multiple processes.

An embodiment of the computer system 10 of FIG. 1 may include one or more hosts operating in accordance with the first embodiment, as maintaining the host local cache of GNS data and using host version numbers, and one or more other hosts operating in accordance with the second embodiment. Additionally, an embodiment may include groups of a particular type defined in accordance with the particular host system. For example, a group may be defined that is: valid on a first type of host system only, or valid on more than one type of host system. The particular group types and which types are valid on which one or more system types may vary with each embodiment and functionality included therein.

As described elsewhere herein, there are instances when two different groups having the same name may come into being even though an embodiment may not allow two groups to be created with the same name and explicitly checks for this condition. In connection with creating a group or updating GNS data for an existing group, an embodiment may perform an additional check immediately prior to updating or writing out the GNS data changes. For example, when a request is made to create a group with name X, the GNS process may first check to see if there is a group with this name already in existence by performing for each data storage system: obtaining a GNS data lock, reading the GNS data, and releasing the GNS data lock, The GNS process may then obtain the new group data and now proceed to create the new GNS group by writing out the GNS data update to each data storage system having devices in the newly created group. Prior to writing out the new group data, the GNS process on the host may obtain the lock for a data storage system's GNS data, perform an additional check to ensure that no group was created having the same name as the new group, and then write out the new GNS group data to the data storage system.

A GNS process on a host may determine which particular GNS groups have had data modified by using the group version numbers as maintained on each data storage system described elsewhere herein. If a CSC process posts a message to a GNS process that there has been a change to a particular data storage system's GNS data, the posted message in an embodiment may indicate only that there has been a change, but not indicate what particular group's data has been modified, created, and the like. Accordingly, the GNS process may determine which group or groups have had associated GNS data updated by examining the GNS group versions. This is described elsewhere herein in connection with the first embodiment.

It should be noted that a system operating in accordance with the techniques of the alternate embodiment may otherwise use processing steps described in connection with the first embodiment.

The foregoing provides for GNS group definitions that may be characterized as local with respect to the one or more data storage systems including devices involved in a particular GNS group definition.

Techniques exist which provide for the pairing of a device on one data storage system with another device on a remote data storage system. Thus, one or more of the devices included in a local GNS group may be paired with one or more corresponding devices in a remote data storage system. These device pairings may be used with a product, for example, such as the Remote Data Facility (RDF) product provided by EMC Corporation of Hopkinton, Mass., as described, for example, in U.S. Pat. No. 5,742,792, issued on Apr. 21, 1998, to Yanai et al., which is incorporated by reference herein. With RDF, a user may denote a first storage device as a master storage device (an "R1" device") and a second storage device (an "R2" device) as a slave storage device. Other variations of RDF may provide a peer-to-peer relationship between local and remote storage systems. A host may write data to a first storage device which may be copied to the second storage device in a different location so that if a disaster occurs rendering the first storage device inoperable, a host may resume operation using the data of the second storage device. With use of RDF, the host interacts directly with a local or first storage device (R1 device). Any changes made to the local storage device are automatically provided to a second remote storage device (R2 device) using RDF. The local and remote storage devices may be connected by a data link, such as an ESCON link or a Fibre Channel link. The RDF functionality may be facilitated with the use of an RDF adaptor, such as an RA, provided at each of the storage devices described elsewhere herein in more detail. These local and remote device pairings may be defined as an RDF pairing.

In conjunction with the use of GNS groups described herein, a GNS group definition may be defined which includes a device also included in an RDF pairing. For example, a GNS group definition may be defined that includes a first or local device with respect to the GNS group definition. This first device may be included in a first data storage system that is remotely connected to a second data storage system including a second device. The first or local device (R1) and the second remote device (R2) are defined as an RDF pairing. A GNS group definition included in the first data storage system may have a mirrored GNS group definition on the second data storage system remotely connected to the first data storage system. This remotely mirrored GNS group may be used, for example, in connection with disaster recovery situations where applications fail over or are restarted on a remote host connected to a remote data storage system.

Changes to local GNS group definitions may be automatically propagated from the local data storage system to the remote data storage system in accordance with defined RDF pairings in order to synchronize data of both the local and remotely mirrored GNS groups. In one embodiment, the creation and maintenance of both the local GNS group and the remote mirror of the GNS group may be performed by the GNS daemon as described elsewhere herein.

RDF may be used in an embodiment in communicating data between data storage systems for any one or more different purposes including, for example, maintaining a remote backup copy of data, and communicating other data, such as group data, that may be stored on two data storage systems connected via RDF. This is described elsewhere herein in more detail.

Figure 20:
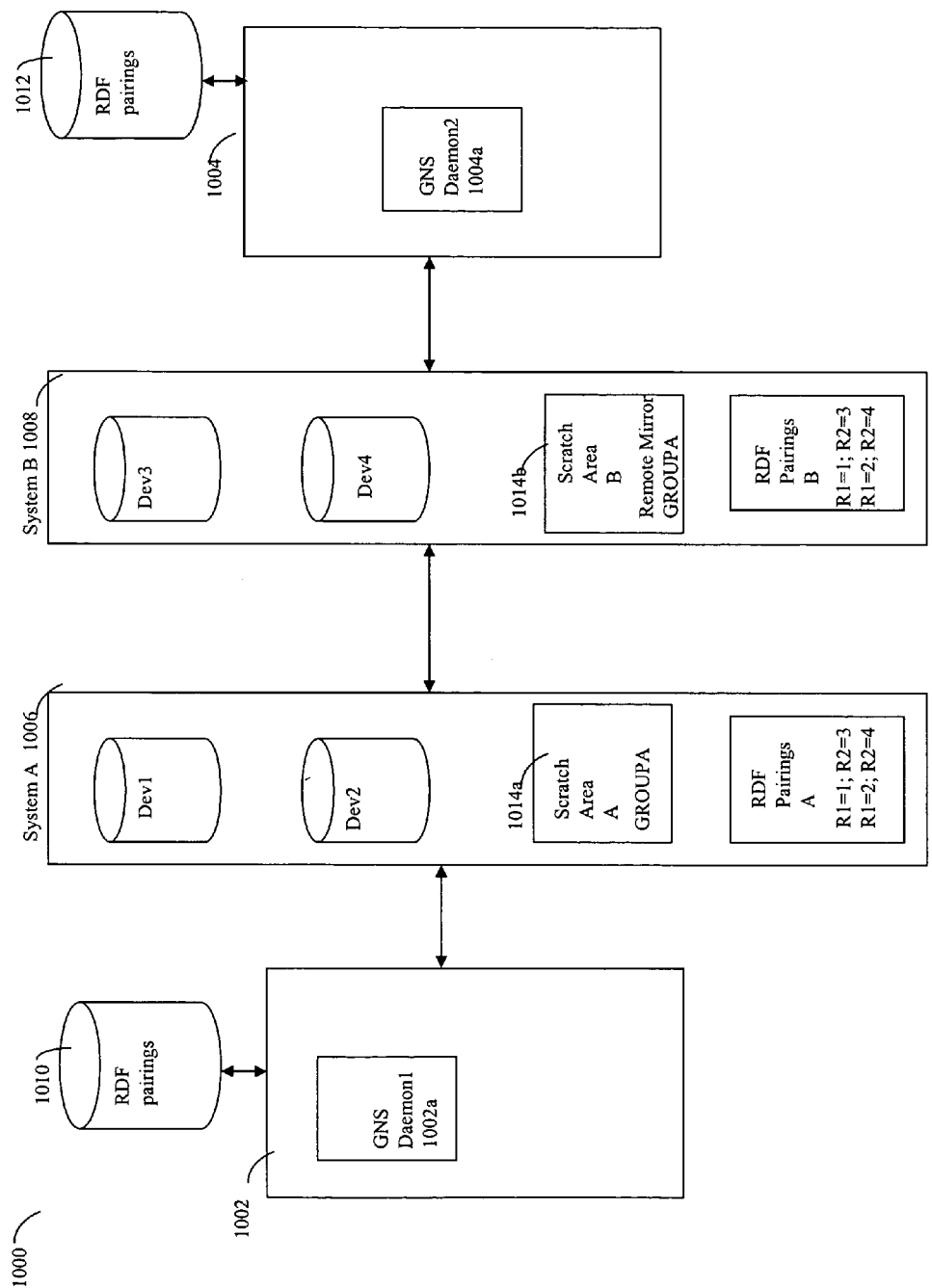
FIG. 20 is an example of a snapshot a system illustrating remotely mirrored groups.

Referring now to FIG. 20, shown is an example of an embodiment 1000 of components that may be included in a system utilizing the techniques described herein for remotely mirrored GNS groups. It should be noted that components described and illustrated in 1000, such as the GNS daemons, the scratch areas, the data storage systems, and other components included in 1000 are described elsewhere herein in more detail.

The example 1000 includes a first host 1002 with a first GNS daemon 1002a, a data store 1010 of RDF pairings and other data cached locally on the host, a first data storage system A 1006, a second data storage system B 1008, and a second host 1004 with a second GNS daemon 1004a and a data store 1012 of RDF pairings and other data local to the second host 1004. Included in each of the data storage systems 1006 and 1008 are one or more devices, a scratch area for storing GNS group data associated with that particular data storage system as described elsewhere herein, and a copy of RDF information, such as RDF pairings of devices included in each of the data storage systems. In 1000, the data storage systems 1006 and 1008 may communicate using RDF.

Initially, when a group is defined, one or more of the devices included in system A 1006 may be included in a particular GNS group definition. For example, devices Dev1 and Dev2 may be included in one of the groups. As part of the creation of this group definition, the GNS daemon 1 1002a may read information from a data store 1010 regarding RDF pairings. RDF pairings may be a table of local and remote device pairings. As described herein, an R1 device may be referred to as the local device from which data is propagated to a second remote or R2 device using RDF functionality as described elsewhere herein.

Prior to performing a group creation or a modification to an existing GNS group, the GNS daemon 1002a reads a locally cached copy of the RDF pairings and other information from the data store 1010. In one embodiment, the data store 1010 of RDF pairings may be maintained by one or more processes executing on the host system 1002. As described elsewhere herein, a data store, such as the data store 1010, may include a local cache copy of RDF pairings and other information used in connection with one or more APIs, such as the APIs described elsewhere herein for GNS groups. Accordingly, when a first API is performed for creating or modifying a GNS group including dev1 and/or dev2, the GNS daemon 1002a may use the RDF pairings and other data from 1010. When an operation of defining or modifying a GNS group is complete, as described elsewhere herein, an updated version of the GNS data is written out to the scratch area 1014a. In an embodiment supporting remotely mirrored GNS groups, additional GNS group information as related to the remote device pairings may also be stored in the scratch area 1014a. An example of an expanded GNS group definition and associated data that may be included in an embodiment supporting remotely mirrored GNS groups is described elsewhere herein in more detail.

As part of GNS group definition and update processing, the GNS daemon 1 1002a on host 1002 may also communicate information to the remote data storage system, such as system B 1008, to create and maintain an up-to-date remotely mirrored GNS group. In the example 1000, if a group A is created or updated which includes Dev1 and Dev2, a remotely mirrored GNS group may be created or updated on data storage system B 1008. The GNS group definition in 1008 is maintained from the point of view of the remote system B so that the group definition in 1008 identifies as "local" the devices dev3 and dev4 and, in accordance with the RDF information, may identify as "remote" pairings one or more of the devices dev1 and dev2. In one embodiment, the GNS daemon 1 1002a may communicate GNS group data to the remote system such as system B 1008 using remote procedure calls and/or synchronous RDF. Generally, a GNS daemon 1 1002a may propagate GNS data changes or initially create a group on a remote data storage system either indirectly or directly. For example, the GNS daemon 1 1002a may communicate GNS group data to system B 1008 through system A 1006. Alternatively, the GNS daemon 1 1002a may have a direct connection and communicate through this communication connection to system B 1008. Other embodiments may use other techniques and connections than as described herein. It should be noted that synchronous RDF is described elsewhere herein and may be used to propagate remotely mirrored GNS group data and other data between remotely connected data storage systems. On both the local and remote data storage systems, the GNS data is stored in respective scratch areas of each data storage system as described elsewhere herein.

In connection with one embodiment, the local and remote RDF pairings are placed in the data store 1010 prior to performing a GNS group creation or modification. It should be noted that the copy of the RDF pairings in 1010 is a local cache of RDF data that may be stored on each of the data storage systems such as 1006 and 1008. The data store 1010 of RDF pairings and other data may be maintained by a process, such as the GNS daemon 1 1002a, that executes on the host 1002 and periodically polls each of the one or more data storage systems which are local to the host 1002 for RDF pairing information as well as other information. It should be noted that an embodiment may use this as well as other techniques in connection with maintaining a locally cached copy of the RDF pairings and other data 1010 used by the daemon 1002a on a host. It should also be noted that an embodiment may obtain RDF data directly from each of the data storage systems and embodiments as well as maintain and utilize a cached copy such as in data store 1010. The host local copy 1010 of the RDF pairings and other data may be maintained on a disk cache or in a designated portion of host memory, or other type of location from which the RDF pairings and other information may be used by components executing in the host 1002.

An embodiment may also receive the RDF device pairings using another mechanism that is different from that used in maintaining other information in the cached copy 1010. For example, in one embodiment, if the RDF pairings are usually not modified, it may not be desirable to have a polling or other process that executes periodically to maintain the RDF pairing information in 1010. A manual or other update of the RDF pairings included in 1010 may be appropriate. However, a polling process that executes at regular periodic intervals may be appropriate for maintaining the other GNS data, locally and/or remotely, included in 1010 as described elsewhere herein.

In one embodiment, the GNS daemon may not perform processing to obtain and/or maintain the RDF pairing information used for remote group mirrors as described herein. Additional code performing GNS operations included in an application layer, such as an API library, may obtain the RDF information. When the additional GNS code creates or otherwise modifies a GNS group, the additional code communicates group information, including any RDF information, to the GNS daemon. Thus, the additional GNS code may performing the polling or other processing used in maintaining the data store 1010 of RDF pairings in FIG. 20 as described above. Other embodiments may have other components perform the processing for obtaining the RDF information than as described herein.

An embodiment may provide an option for enabling and disabling the GNS remote mirroring functionality described herein. In one embodiment, an option may be specified in the GNS daemon options file or configuration file described elsewhere herein for use in enabling and disabling remote mirroring for a particular GNS daemon. In one embodiment, a single boolean value may be used in designating whether remote mirroring is enabled for all of the GNS groups created by the GNS daemon. It should also be noted that an embodiment may provide for a different level of granularity in connection with enabling and disabling remote mirroring of GNS groups. For example, an embodiment may include an option for enabling/disabling remote GNS group mirroring for each GNS group, a defined set of GNS groups, or on a per local data storage system basis.

When a GNS daemon starts up on a host, the GNS daemon obtains a list of all of the local and remote data storage systems known from that particular host. Additionally, the GNS daemon, or other process, may obtain the RDF pairing information. As described above, the RDF pairings as well as other types of configuration data may be maintained in a local data store on cache or in the host memory. As also described above, different techniques may be used in maintaining an up-to-date copy of the RDF pairings and other data locally on the host. As part of this processing, the GNS daemon may also obtain other information related to the device configuration and associated connectivity including, for example, newly added or removed devices, newly added or removed connections, and the like. This may be done through a polling technique as well as through a notification technique in which a particular process on the host 1002 may be notified in the event that there is a change to a device configuration, RDF pairing, GNS group data, and the like, within the system 1000. In the event that there is any change, the GNS daemon 1002a may receive notification of any such update by previously registering as a listener. In one embodiment, an application, process, and the like, (such as the GNS daemon) may register to be notified upon the occurrence of certain events, such as, for example, updates to one or more data sources. When the GNS daemon receives such notification of an update, the GNS daemon may obtain an updated copy of the modified information which may be stored in the data store 1010 as well as in memory for use by the GNS daemon 1002a when performing GNS operations. In other words, as described herein in connection with other operations, the GNS daemon or other process may maintain an in-memory copy of information including RDF pairings and known local and remote devices for use in connection with performing operations for GNS functionality described herein. This is in addition to the GNS group data that is also stored in a local cache copy 1010 for use by the GNS daemon and other processes as described elsewhere herein.

A remotely mirrored GNS group may be characterized as a remote view of a GNS local group from a point of view of a remote host. For example, group A has a local GNS group definition included in the scratch area a 1014a from the point of view of the host 1002. A remote mirror of the GNS group A is included in scratch area b 1014b which may be characterized as a remote view of the group A from the view point of host 1004. The data of a remote mirror of a GNS group, as may be included in area 1014b, may not be an exact replication or copy of the GNS group data, as maintained in the scratch area 1014a. The GNS group data of the remotely mirrored group in scratch area 1014b may include some of the same data of the local GNS group of area 1014a with appropriate modifications in accordance with the remote viewpoint such that the remotely mirrored GNS group definition may be used on a remote system in connection with a restart or other operation from a remote system. For example, in the event that host 1002 and data storage system A experience a data disaster, host 1004 and the remotely mirrored GNS definition for group A included in 1014b are used. With remotely mirrored GNS groups, the remote mirror of a GNS group may be characterized as a remote copy of a group definition, such as group A, with appropriate changes such that the GNS group definition may be used and accessed from a remote site in the event of a disaster on a local site.

Figure 21:
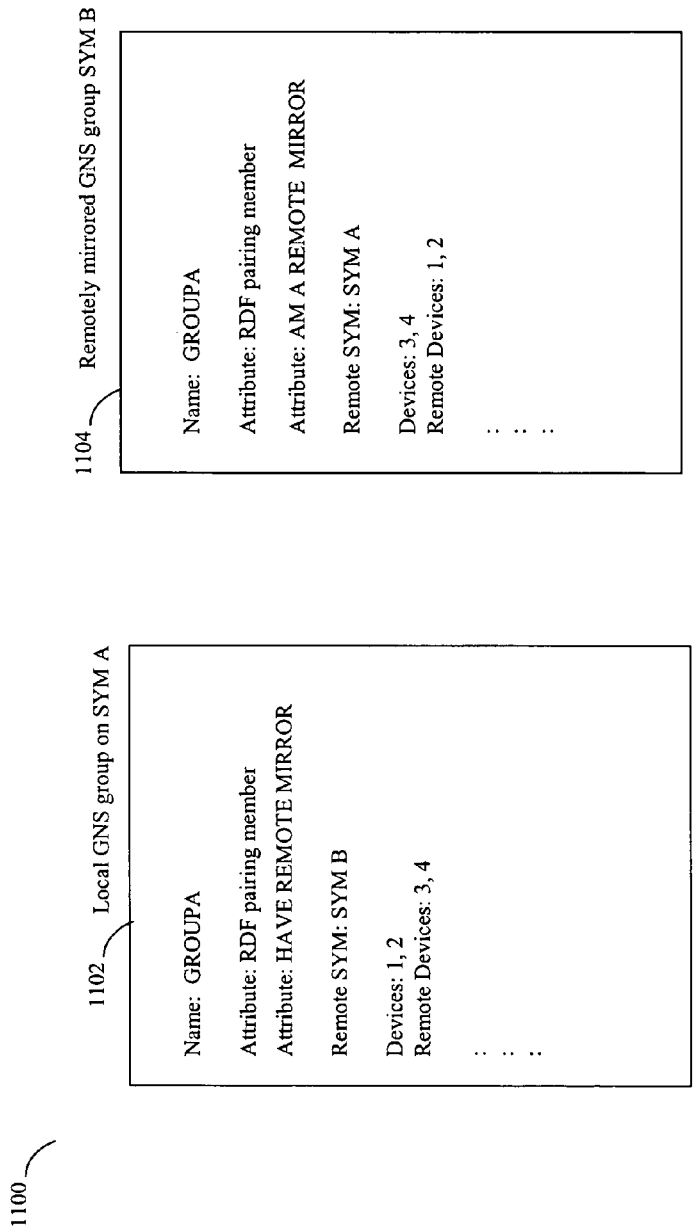
FIG. 21 is an example of an embodiment of data that may be included in local and corresponding remote GNS group definitions.

Referring now to FIG. 21, shown is an example of a representation 1100 of GNS group data as may be maintained on local and remote data storage systems, respectively, for a local GNS group and its remotely mirrored copy. It should be noted that other group data and representations thereof as may be included in a group definition are described elsewhere herein. Data 1102 may be stored in scratch area 1014a and data 1104 may be stored in scratch area 1014b. Included in each of 1102 and 1104 is a group name, GROUP A, and an attribute indicating that this group includes devices used in RDF pairings. In one embodiment, the same group name is included in both the local GNS group definition and its remote mirror as maintained on a remote data storage system. Also included in 1102 is an attribute to denote that this local GNS group has a remotely defined counterpart. In this embodiment, the attribute that may be associated with the local GNS group having a remote counterpart is referred to as the HAVE REMOTE MIRROR attribute. Similarly, a complementary attribute may be defined and included in a remote GNS group definition denoting that a GNS group definition is a remote mirror of another group on a local system. In one embodiment, the remote mirror includes the AM A REMOTE MIRROR attribute. The GNS group definition 1102 on the local data storage system may include a list of one or more data storage systems which are the designated remote data storage systems. With respect to data storage system A, SYM B is included in 1102 as a designated remote data storage system. Similarly, on the remote data storage system SYM B, SYM A is included in 1104 as a designated remote data storage system since data storage system A is remote with respect to data storage system B. This designation of remote data storage systems is one example of a GNS group data modification in accordance with a view point of the remote data storage system. The definition in 1104 is made from the view point of data storage system B where data storage system B is local and its respective remote data storage system is SYM A. The designation of a remote data storage system within the local group definition 1102 is SYM B because, with respect to SYM A as the local data storage system, SYM B is its remote counterpart.

Within 1102, devices 1 and 2 are included in the local GNS group definition for group A. The remote devices, corresponding to the local devices 1 and 2, are 3 and 4. The designated devices and corresponding remote devices within a GNS group definition are made with respect to the particular data storage system on which the GNS group definition is included. Included in 1104 are devices 3 and 4 with devices 1 and 2 specified as their remote counterparts from the point of view of the remote system.

It should be noted that each of the group definitions 1102 and 1104 may also include GNS group data which is local with respect to each of the data storage systems. In other words, there may be data included in 1102 which is not propagated, changed or unchanged, to its remotely mirrored GNS group. For example, there may be particular attributes or values on one system having no meaning at a remote site. An embodiment may also include attributes or information in a local GNS group definition that may not be mirrored in a remote GNS group definition due to ambiguities on how the local information may be transformed to a remote counterpart. In an instance, for example, where a local attribute may be mapped to multiple remote counterpart attributes, an embodiment may choose not to remotely mirror such attributes due to the indefiniteness. This may vary with the types of attributes and the particular remote mappings for each local attribute included in an embodiment.

Generally, data that is included in a remotely mirrored GNS group, with respect to its local GNS group counterpart, may fall into one of three general classes. GNS data may be classified as local only with respect to a particular data storage system or GNS group and is not propagated to a remote mirror of a GNS group. A second class of data is that GNS data which may be propagated or copied from a local GNS group definition to its remote GNS group definition "as is". Examples of this include the GNS group name. A third class of data that may be included in a GNS group is data that may be modified when copied into a remotely mirrored GNS group because the local GNS group data is modified in accordance with the particular remote system view point. Examples of this third class of data include the device and corresponding remote device information of a GNS group definition as illustrated in 1100. The prospective of what is remote and local may vary.

Portions of the data illustrated in each of 1102 and 1104, such as the group name and one or more of the attributes, may be included in group definition header information and other fields or records of a group definition described elsewhere herein.

In one embodiment, applications that may be executing on a particular host may view only those GNS group definitions which are included in data storage systems local to that particular host. An embodiment may vary the different GNS group information that may be displayed or available from the view point of an application executing on a particular host. For example, there may be a host system security policy allowing only certain group information to be accessible to an application.

In connection with creating and/or updating a remotely mirrored GNS group by a particular name, a GNS daemon on a local host may encounter a GNS group definition already in existence having the AM A REMOTE MIRROR attribute set on a remote data storage system. An embodiment may handle this and other situations in connection with creation and maintaining GNS group data in a variety of different ways. In one embodiment, if a GNS daemon on a local host encounters a GNS group definition for a particular group name already created on a remote side with the AM A REMOTE MIRROR attribute set, the GNS daemon may assume that the remote GNS group definition is a remote mirror of a locally defined GNS group by the same name. In the event that a GNS daemon on a local system encounters a GNS group definition for a group already created on a remote system that does not have the AM A REMOTE MIRROR attribute set, the local GNS daemon may assume that another daemon executing on a remote host has created this GNS group definition as a group definition which is local with respect to the remote host. Not having the AM A REMOTE MIRROR attribute set for an existing group included in a remote data storage system means that the existing group was previously created or updated by another at the remote data storage system. The existing group on the remote data storage system is thus not related to the local group for which the GNS daemon is trying to create/update a remote mirror and the GNS daemon does not overwrite the existing group.

It should be noted that a group definition on a remote data storage system with the AM A REMOTE MIRROR attribute set may have been created or updated in connection with previous processing for updating remote mirrors.

In connection with synchronizing the creation of remotely mirrored GNS groups, an embodiment may enable and disable the appropriate GNS daemons on each of the different systems. For example, the GNS daemon on the host 1002 may be enabled to create remotely mirrored GNS groups and the GNS daemon on the host system 1004 may accordingly be disabled from creating remotely mirrored GNS groups. This is one technique that may be used in an embodiment to avoid situations, for example, where each of the GNS daemons on the hosts 1002 and 1004 are attempting to create the same GNS group and its remote mirror at the same time. In the foregoing, remote mirrors of GNS groups may only be created in one direction with respect to two hosts in which at most one system is enabled at a time for remotely mirroring GNS groups. Other embodiments may use other techniques in connection with minimizing "group collisions" in which the same group is attempting to be mirrored in both directions at a same point in time. A second technique, as described elsewhere herein in more detail, includes processing which does not remotely mirror a local group if there is already a remote group by the same name as the local group and the AM A REMOTE MIRROR attribute is not set. Using this second technique, for example with reference to FIG. 20, host 1's GNS daemon may mirror group A from 1006 to 1008. At some later point, host 2's GNS daemon may attempt to mirror group A from 1008 to 1006. Host 2's daemon determines that group A on 1006 does not have the AM A REMOTE MIRROR attribute set and does not continue processing to mirror group A on 1006.

In one embodiment, when a local group definition is modified and there is already an existing group definition with the AM A REMOTE MIRROR attribute set, the AM A REMOTE MIRROR attribute may be cleared. For example, with reference to FIG. 20, group A may be mirrored from 1006 to 1008. An administrator may then modify group A as included in 1008 locally using the host 1004 during which time processing also clears the AM A REMOTE MIRROR flag. The foregoing may be used to implement a policy in which any modifications to a group made locally override those of the remote mirror. Whether an embodiment clears the AM A REMOTE MIRROR attribute in accordance with the foregoing policy may vary with each embodiment.

The detection and processing associated with such occurrences may vary in accordance with each embodiment.

In connection with propagation of GNS group data from a local data storage system to a remote data storage system, such as, for example, in connection with defining or updating a remotely mirrored GNS group, data may be propagated using any one or more different techniques. For example, in one embodiment, GNS data may be immediately communicated to the remote data storage system's scratch area if a particular communication connection between the two data storage systems is available. An embodiment may also batch GNS data and communicate GNS data from the local to the remote data storage system at predetermined intervals. For example, a process, such as an asynchronous background copying process, executing on a host system may run at configurable intervals to propagate GNS data changes or differences from a local data storage system to a remote data storage system. In the event, for example, that the connection is unavailable, an embodiment may continually try to communicate GNS data to the remote data storage system until transmission is successful. The GNS updates may also be propagated from a local to a remote data storage system in connection with the performance of other processing, such as, for example, when synchronization or initialization processing is done. In one embodiment, the foregoing background copying may be performed by the GNS daemon.

It should be noted that as described above, a process (such as the GNS daemon) executing on a host system may poll the one or more data storage systems to determine changes in RDF information, device configuration, and GNS group data. An embodiment may also provide for notification to the host or one or more processes (such as the GNS daemon) within the host when there has been a change to RDF pairings or other device configuration data rather than use a polling technique. When the GNS daemon detects that there has been a modification to the RDF pairings or other device configuration information (by polling, through notification, or some other technique), the GNS daemon may then respond by rereading that RDF pairings or other data which has changed. In the event that a change has occurred to the RDF pairings or device configuration information that effects a GNS group, the GNS daemon may then push these changes out to the local and any remote GNS group definitions as maintained, respectively, on local and remote data storage systems in accordance with a manner in which other GNS data modifications are propagated within a system.

In one embodiment, the GNS daemon may not obtain the RDF pairing information. Additional code performing GNS operations included in an application layer, such as an API library, may obtain the RDF information. When the additional GNS code creates or otherwise modifies a GNS group, the additional code communicates group information, including any RDF information, to the GNS daemon. Thus, the additional GNS code may performing the polling or other processing used in maintaining the data store 1010 of RDF pairings in FIG. 20 as described above. Other embodiments may have other components perform the processing for obtaining the RDF information than as described herein.

As described elsewhere herein, the processing for obtaining and maintaining the RDF information used for remote mirrors may be performed by code other than the GNS daemon. In such an embodiment, the GNS daemon may create and/or modify group data. If RDF pairings change, the GNS daemon may not perform the processing in connection with determining that the group definitions are out of date and need to be accordingly updated. Such processing may be performed by code other than the GNS daemon such as, for example, included in an API library.

It should be noted that an embodiment may also provide for having the GNS daemon or other process maintain GNS group definitions used in one or more other applications, such as Power Path. Appropriate GNS data modifications may also be propagated for use in connection with these other applications.

In one embodiment, the data store 1010 including the RDF pairing information may also include other group data as maintained in a locally cached copy on host 1002. In the event a GNS group data modification is detected by the GNS daemon or other process as may vary with each embodiment, the locally cached copy (as stored in 1010 of FIG. 20, for example) as well as the in-memory copy that may be maintained and used by the GNS daemon are also updated. A GNS group update or modification may be cached locally both in memory and on disk and may be pushed out to the appropriate GNS group definitions as stored on the local and/or remote data storage systems at any one or more different times. In one embodiment, these group changes may be propagated at periodic intervals as described elsewhere herein as well as immediately pushed out. An embodiment may also choose to propagate these updates in connection with other processing or synchronization operations. An embodiment may vary the location and storage used for RDF pairing information and other group data as maintained locally on a host than as described herein.

Figure 22:
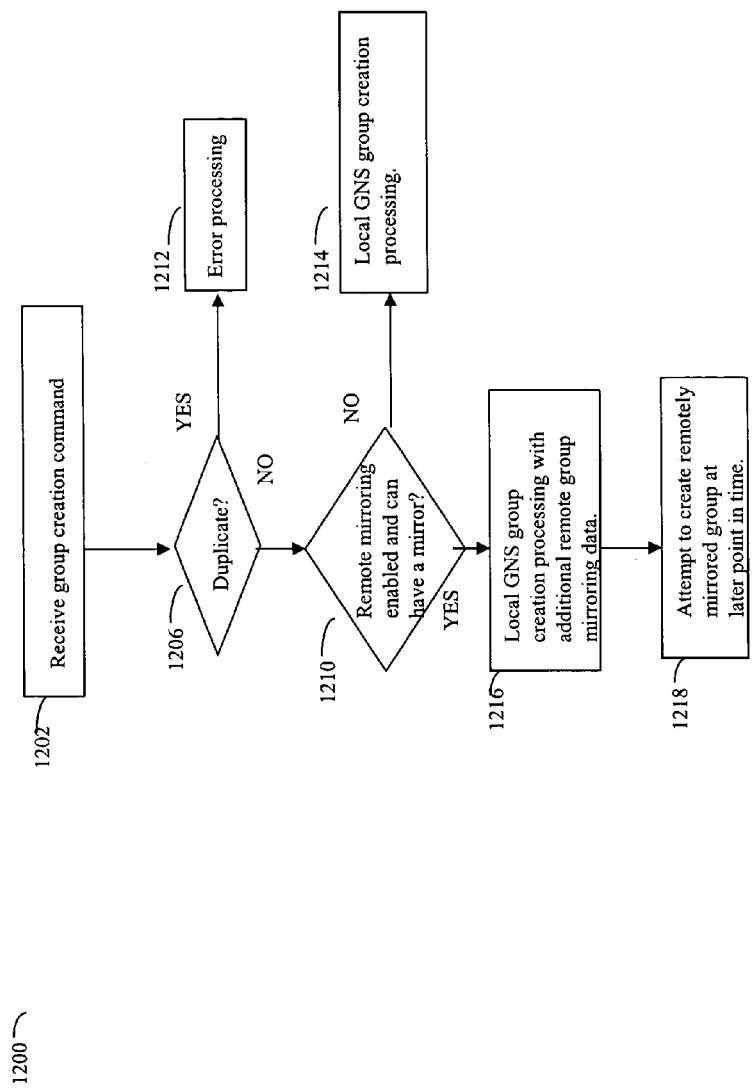
FIGS. 22-24 are flowcharts of processing steps that may be performed in an embodiment utilizing remotely mirrored groups.

Referring now to FIG. 22, shown is a flowchart of processing steps that may be performed in one embodiment in connection with creation of a GNS group. It should be noted that the processing steps of the flowchart 1200 of FIG. 22 summarize the processing steps described above in connection with creation of a GNS group and possibly its remote mirror. It should also be noted that the steps of flowchart 1200 may be performed by a GNS daemon on a host system. At step 1202, a GNS daemon receives a command to create a GNS group. At step 1206, a determination is made as to whether the group name received by the GNS daemon at step 1202 is a duplicate. This may be determined, for example, by examining GNS group names of currently defined GNS groups. If so, control proceeds to step 1212 where error processing may be performed. It should be noted that an embodiment make take any one or more different approaches in connection with handling the condition where an attempt is being made to create a new GNS group having a duplicate name. At step 1206, if it is determined that the GNS group creation command received does not designate a duplicate group name, control proceeds to step 1210 where a determination is made as to whether remote GNS group mirroring is enabled for the current GNS daemon process, and whether the group can have a remotely mirrored GNS group. In one embodiment, a determination may be as to whether a group can have a remotely mirrored group if the group includes a device which is also included in an RDF pairing. If the condition determined at step 1210 is not true, control proceeds to step 1214 to perform local GNS group creation processing as described elsewhere herein without including additional remote mirroring data. In one embodiment, step 1214 may include updating the local cache copy, the GNS daemon's in-memory copy, and also writing out the updated GNS group data to the one or more local data storage systems. Otherwise, if the condition of step 1210 is determined to be true, control proceeds to step 1216 where a local GNS group is created with the additional remote group data. Examples of this additional data are described elsewhere herein for example in connection with FIG. 21. Generally, the additional remote group mirroring data is that data which is used in connection with specifying a remotely mirrored GNS group counterpart on a remote storage device. This data may then be stored in the local cache copy, the in-memory GNS copy, and written out to the local data storage systems, as in connection with step 1214 processing. At some later point in time, processing steps are performed for 1218 in an attempt to create a remotely mirrored GNS group. In one embodiment, when updates are made to GNS group data, such as in connection with defining a new GNS group or updating an existing GNS group, local copies (in cache, in-memory and on local data storage systems) may be updated. Propagating the GNS group data to the remote data storage system is performed in connection with other processing, such as a polling process described in connection with FIG. 24, or other operation causing synchronization of one or more of the local copies of GNS group data with remotely mirrored GNS group data.

Figure 23:
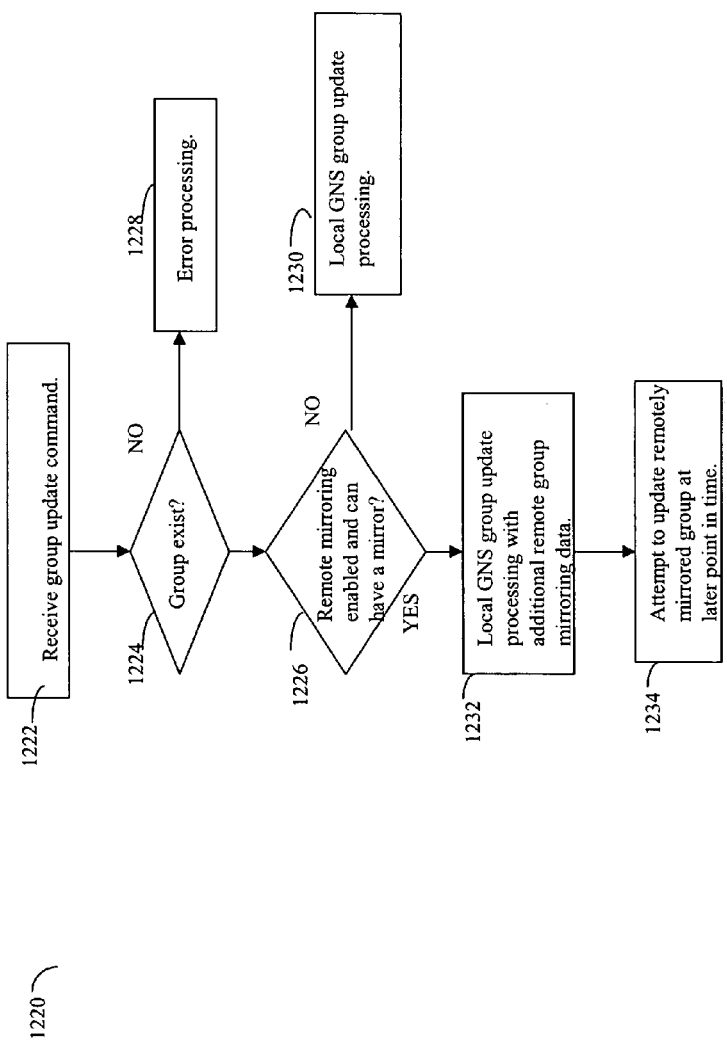

Referring now to FIG. 23, shown is a flowchart 1220 of processing steps that may be performed in an embodiment in connection with processing a GNS group update command. The processing steps of 1220 may be performed, for example, by a GNS daemon on a host. At step 1222, the updated GNS group data as included in a command or API for updating an existing group is received. At step 1224, a determination is made as to whether the group exists locally. This may be determined by the GNS daemon examining its in-memory copy of the locally cached GNS data. If no group is currently defined, control proceeds to step 1228 to perform error processing. If a group is currently defined, control proceeds to step 1226 to determine if remote mirroring is enabled and whether the current group can have a remote mirror. If not, control proceeds to step 1230 where local GNS group update processing may be performed. Step 1230 processing may include updating any local copies of GNS data on the host and on local data storage systems. This update may not include the additional information needed to specify remotely mirrored groups. If step 1226 evaluates to true, control proceeds to step 1232 where the local GNS group update processing may be performed, as described in connection with step 1230, using the additional group remote mirroring data. Step 1234 processing is similar to as described in connection with step 1218 in that an attempt to update the remotely mirrored group data is performed at a later point in time.

Figure 24:
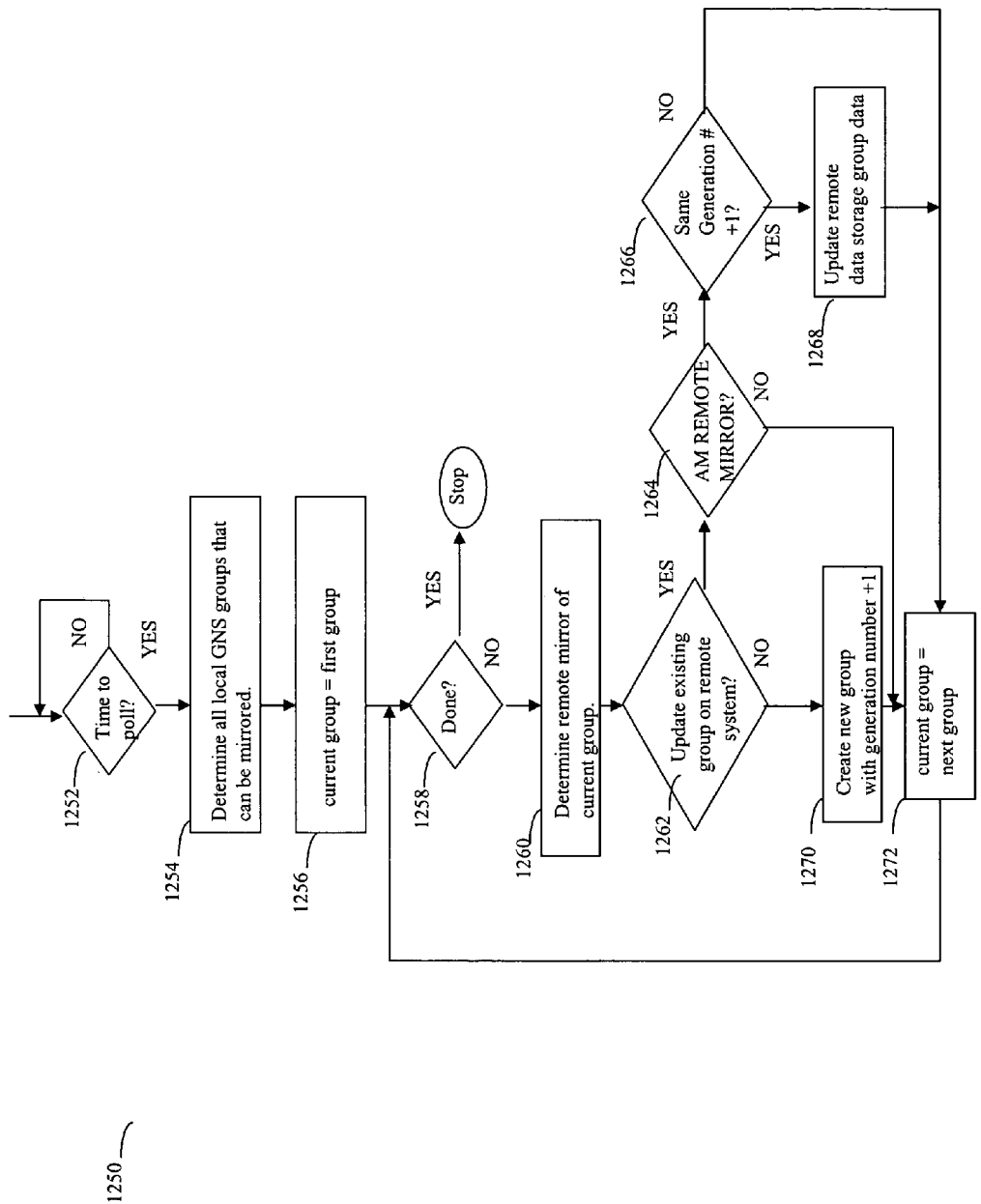

Referring now to FIG. 24, shown is a flowchart 1250 of processing steps that may be performed in connection with periodic synchronization of data for remotely mirrored groups in accordance with local group definitions. The steps of 1250 may be performed by the GNS daemon. It should be noted that the processing of flowchart 1250 of FIG. 24 may be performed in an embodiment for step 1218 of FIGS. 22 and 1234 of FIG. 23. At step 1252, a determination is made as to whether a current time value indicates that it is time to update the remotely mirrored groups. If not, control returns to step 1252 until such a time is reached. A time interval may be specified, for example, in a GNS daemon options file indicating the periodic updating interval used at step 1252. An embodiment may select a time interval that may vary in accordance with each particular configuration, system usage, and the like. In one embodiment, this time interval may be of a lesser frequency than the polling interval selected in connection with maintaining the local cache of GNS data by polling the local data storage systems connected to a host upon which the GNS daemon is executing. Control proceeds to step 1254 where all the local GNS groups that can be mirrored are determined. Whether a group can be mirrored may be determined in any one or more of a variety of ways that may vary with each embodiment. In one embodiment, the group definition may include one or more attributes indicating whether a device from this group is also included in an RDF pairing. Additionally, step 1254 processing may also utilize any restrictions that may be imposed within an embodiment for using remotely mirrored GNS groups. For example, in one embodiment, only groups including devices from the same data storage system may be remotely mirrored. An embodiment may also allow remotely mirrored groups including devices spanning multiple data storage systems with one or more restrictions. It should also be noted that the GNS group data used in performing this synchronization may be based on a local copy of GNS group data from one or more different locations. In one embodiment, step 1254 may also include synchronization of the local copies of GNS data on the host and the local data storage system, and the copy then included in the local data storage system may considered the master copy used in synchronizing remotely mirrored groups. In another embodiment, step 1254 may assume that the copy in the local data storage system is already up to date and not perform any other GNS data synchronization on the local side. In connection with step 1254, an embodiment may also create remote mirrors for data storage systems which are also not local with respect to a same host. In other words, it may be possible for a data storage system to be both local and remote with respect to a host depending on how the data storage system is connected to other data storage systems. In this instance, no remote mirror may be created on such a data storage system. At step 1256, current group is assigned the first group from the set determined at step 1254.

At step 1258, a determination is made as to whether all the groups have been examined. If so, processing stops. Otherwise, control proceeds to step 1260 to determine the remote mirror of the current group. This remote mirror may be determined by creating a version of the local group data from the point of view of a remote system as described elsewhere herein. At step 1262, a determination is made as to whether there is already a remote group on a remote data storage system with the same name. If there is a group on the remote data storage system, then the existing group is updated. Otherwise, if there is no existing group, a new group definition is created. If there is no existing group as determined by step 1262, control proceeds to step 1270 where a new remote mirror for the local group definition is created. Additionally, included in the group definition is a generation number which is the local group's generation number+1. In this embodiment, recall that generation numbers are unique to each group. The generation number may be used in differentiating between groups having the same name in connection with remotely mirrored GNS groups as well. The generation number is incremented by 1 in this embodiment and used to indicate that this remote mirror being created is a remote mirror for the particular group having the same name and generation number of the local group. This may be used in resolving various issues, for example, in which a single remote mirror may be associated with multiple local GNS groups having the same name as the single remote mirror by the same name, and others. An example is described in following paragraphs. Another embodiment may use other techniques and variations of the foregoing (such as adding a different increment to the generation number, XORing with generation number with 1, or some other number to provide for identifying local and remote mirror correspondence) in an embodiment. Control proceeds to step 1272. It should be noted that use of a generation number+1 as described above in a remote group may be used to avoid confusion for another host, which views both the local and remotely mirrored groups as "local", so that the other host views the local and remotely mirrored groups as different groups having a same name. Having different generation numbers associated with both the local and remotely mirrored groups may be used as one technique to ensure that the other host views the two group as distinct.

If step 1262 evaluates to true indicating that there is already an existing group on the remote data storage system, control proceeds to step 1264 where a determination is made as to whether the AM A REMOTE MIRROR attribute of this remote group is set. If not, control proceeds to step 1272. If the remote group with the same name has AM A REMOTE MIRROR set, control proceeds to step 1266 to determine if the generation number of the remote group is the same as the generation number of the local group+1. As described above, a remote mirror is determined to correspond to a same named local group if the remote mirror has the same generation number+1 as that of the same named local group. Step 1266 processing may vary with an embodiment. If step 1266 evaluates to no or false, control proceeds to step 1272. Otherwise, control proceeds to step 1268 to use and update the existing group data.

It should be noted that in one embodiment, if group data for an existing remote group mirror has not changed and has all the correct data matching a current remote group definition, no modification is actually performed to the remote group. In one embodiment, if the AM A REMOTE MIRROR attribute is not set for an existing remote group, the existing remote group mirror was created or modified previously by processing other than as described herein in connection with remote mirroring. An example of the foregoing is described in more detail elsewhere herein, for example, with reference to FIG. 25. Additionally, if the generation number of an existing remote group mirror does not have the expected generation number, for example, as determined at step 1266, the existing remote group mirror is also not modified. If the AM A REMOTE MIRROR attribute is set for an existing remote group mirror, the existing remote group mirror may have been created and/or updated in accordance with a different local group definition. An example of the foregoing is described in more detail elsewhere herein, for example, in connection with FIG. 26.

FIGS. 22, 23, and 24 set forth one embodiment's processing steps that may be executed in connection with remotely mirrored GNS groups. Other embodiments may use different techniques in connection with maintaining GNS group data by: updating any host local copies of group data, updating the GNS data on one or more local data storage systems, and updating remotely mirrored GNS group data on the remote data storage system(s).

It should be noted that an embodiment may choose to propagate the changes to the local and/or remote data storage system at any one or more different points in time. For example in one embodiment, the local GNS group definition or changes may be propagated immediately. The remote copy of the GNS group data for the remotely mirrored group may be propagated also immediately or may be propagated in connection with one or more other different techniques as described elsewhere herein. In one embodiment, the group updates may be propagated out to one or both the local and remote data storage systems when a process, such as the GNS daemon, synchronizes one or more of the locally cached copies of GNS group data with the actual copies on a data storage system. This may occur, for example, in connection with a periodic polling process, an initialization process such as normally performed when an application first begins a session using one or more predefined APIs utilizing the cached copy or copies, and the like.

An embodiment may be selective in allowing the creation of remotely mirrored GNS groups. For example, one embodiment may restrict remotely mirrored GNS groups to those GNS group definitions having devices that do not span multiple data storage systems. Other embodiments may impose other limitations or restrictions that may vary. The particular examples provided herein for the purpose of illustration should not be construed as a limitation of the techniques.

Figure 25:
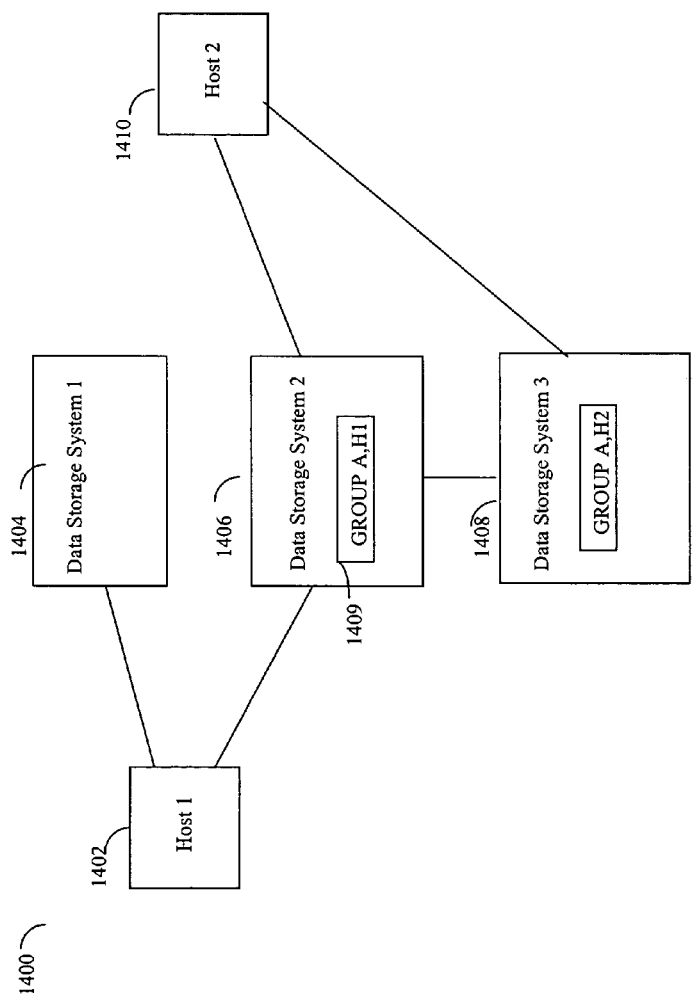
FIGS. 25 and 26 are examples illustrating an embodiment of remotely mirrored groups.
Figure 26:
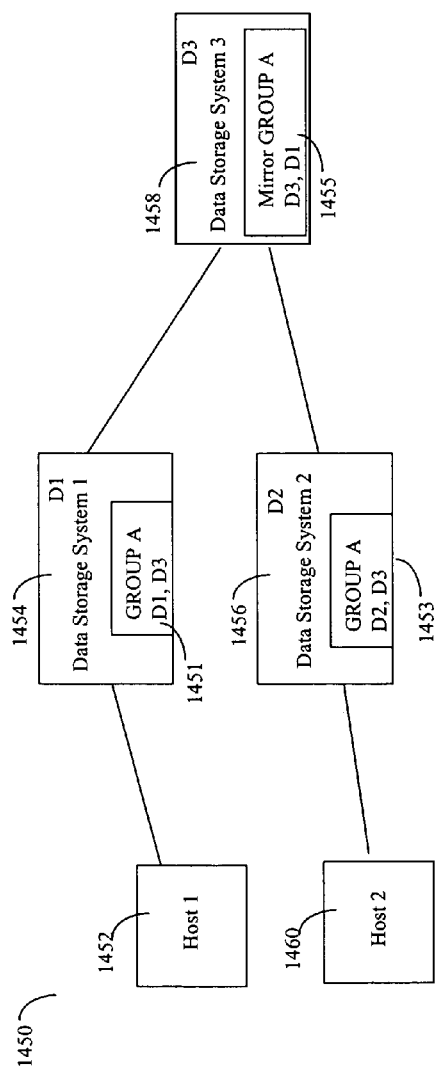

What will now be described are examples in FIGS. 25 and 26 illustrating how the use of generation numbers may be used in resolving issues in connection with remotely mirrored GNS groups in connection with one embodiment as set forth above. Note that detail of the different components in FIGS. 25 and 26 has been omitted for the purposes of simplicity in illustrating the techniques described herein.

Referring now to FIG. 25, shown is an example 1400 of components that may be included in an embodiment using GNS local and remote groups. In 1400, Host 1 is directly connected to data storage systems 1404 and 1406. Host 2 is directly connected to data storage systems 1406 and 1408. Data storage system 1406 is connected to 1408. The connection between 1406 and 1408, as well as other data storage systems described herein, may be an RDF connection. From host 1's point of view, data storage systems 1404 and 1406 are local, and 1408 is remote. From host 2's point of view, data storage systems 1406 and 1408 are local. In processing, host 2 first creates a group A on 1408. At some later point in processing, host 1 creates a group A on 1406. Host 1 has remote mirroring enabled and an RDF pairing is defined for a device on 1406 included in host 1's group A in which the remote device is included in 1408. At some later point, host 1 attempts to create a remote mirror of host 1's group A on 1408. In trying to create the remote mirror, host 1 determines that there is already a group definition for A, but does not use this existing group definition since the AM A REMOTE MIRROR attribute is not set. The foregoing also results in two groups being created with the same name from host 2's point of view. However, since both of these group A's on 1406 and 1408 have their own respective unique generation number, host 2 will not view these incorrectly as being the same group A spanning multiple data storage systems. Host 2 views these two group A's on 1406 and 1408 as being two different groups with the same name. It should be noted that a third host may also have 1404 and 1406 as local data storage systems, and the processing described above in attempting to create a remote mirror for 1409 on 1408 may be performed by a third host different from the host that initially created 1409.

The foregoing is one example illustrating the techniques described in one embodiment utilizing remote and local GNS group names in accordance with the processing described herein.

It should be noted that undesirable or unexpected behavior with regard to mirroring of local groups may occur. For example, with reference to FIG. 25, host 1 may create a local group A 1409 on data storage system 1406. Host 2 may create a local group A on data storage system 1408. Host 1 may then attempt to create a mirror of group A 1409 on 1408 but no actual remote mirror is created since a group A (local to host 2) already exists. The foregoing may present a problem, for example, if there is a reliance on the existence of a remote mirror for disaster recovery.

Referring now to FIG. 26, shown is another example 1450 of components that may be included in an embodiment using GNS local and remote groups. In this example, both host 1 and host 2 are trying the create a remote mirror. In this example, both hosts are trying to create a remote mirror on 1458. Host 1 is the first host to create a remote mirror of group A in 1455 having a generation number=the generation number of group 1451+1. Subsequently, when host 2 tries to create the remote mirror on 1458, no remote mirror will be created corresponding to 1453 since 1455 is determined to exist but with a generation number that does not correspond to group 1453. Accordingly, no remote mirror is created for 1453. It should be noted that the host 1 1452 in this example may only view 1454 as local and host 2 1260 may only view 1456 as local.

Note that the foregoing two examples use a set of policies that may vary in accordance with an embodiment. In these examples, when attempting to create or update a remote group having a same name as a local group, an existing remote group definition is overwritten when it is believed to correspond to the local group. In one embodiment, this may be determined by examining the value of the AM A REMOTE MIRROR attribute and the generation number of the remotely mirrored group.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for storing data about a group, comprising:
    storing, on at least one data storage system, group data if a device of said at least one data storage system is included in said group, wherein said group data includes information used in connection with describing the group, the information used in connection with describing the group including a group definition that defines attributes of the group;
    determining, using the group data, whether the group can have a remote mirror, said determining whether the group can have a remote mirror including determining if said device is associated with another device on a remote data storage system; and
    if the group can have the remote mirror, storing a remote mirror of said group data on said remote data storage system, wherein said group data on said at least one data storage system includes a data storage system identifier identifying said remote data storage system as a designated remote data storage system of the remote mirror and a first attribute denoting that the group has a remotely defined counterpart group on said remote data storage system, the first attribute being different from the data storage system identifier identifying said remote data storage system, and wherein said remote mirror of said group data on said remote data storage system includes a data storage system identifier identifying said at least one data storage system and a second attribute which is a complementary attribute of said first attribute and which denotes that said remote mirror is the remotely defined counterpart group on the remote data storage system, the second attribute being different from the data storage system identifier identifying said at least one data storage system.

2. The method of claim 1, wherein said group data includes at least one of: a device identifier, an attribute of a device in said group, a group attribute, and an attribute indicating that said group can have a remote mirror.

3. The method of claim 1, wherein said group data is distributed on one or more data storage systems, and if a device from a first data storage system belongs to said group, a portion of said group data for said group related to said first data storage system is stored on said first data storage system.

4. The method of claim 3, wherein group data stored on a data storage system is stored in a portion of memory of said data storage system which is accessible to each of a plurality of hosts utilizing said group data.

5. The method of claim 4, wherein each of said plurality of hosts obtains said group data by a process on said each host accessing said portion of memory of said each data storage system.

6. The method of claim 1, wherein said group data is stored locally at each of said plurality of hosts.

7. The method of claim 3, wherein said determining whether group data for said group is included in each of said plurality of data storage systems is performed by a process executing on each of said plurality of hosts.

8. The method of claim 7, wherein an application uses information about said group.

9. The method of claim 7, wherein said process obtains updated group information by one of: said process polling each of said plurality of data storage systems at predetermined intervals, and by said process being notified when an update has been made to group data.

10. The method of claim 1, wherein said remote mirror of said group data is created in accordance with a specified option enabling or disabling creation of remote mirrors of said group data.

11. The method of claim 1, wherein said remote mirror of said group data includes a first portion of data that is a modified portion of said group data in accordance with a viewpoint of said remote data storage system.

12. The method of claim 11, wherein said remote mirror includes a second portion of data that is a copy of a portion of said group data.

13. The method of claim 12, further comprising:
    determining a third portion of said group data that is omitted when storing data for said remote mirror of said group data, said third portion being data that is not applicable to said remote data storage system.

14. The method of claim 1, wherein said storing said remote mirror of said group data is done in response to at least one of: defining a new group, modifying an existing group, and changing device pairings of a local and a corresponding remote device.

15. The method of claim 1, wherein said remote mirror of said group is used by a host connected to the remote data storage system when said at least one data storage system is unavailable.

16. The method of claim 1, wherein said storing of said remote mirror is performed using an asynchronous process maintaining said remote mirror by copying group data from said at least one data storage system to said remote data storage system.

17. The method of claim 1, wherein said group is a first group having a first name, and the method further comprising:
   determining whether there is a group having said first name on said remote data storage system, and wherein said storing is performed when there is no group having said first name on said remote data storage system.

18. The method of claim 17, further comprising:
   determining whether a group definition exists on said remote data storage system having said first name;
   if a group definition having said first name exists, determining whether said group definition is a remote mirror definition that corresponds to said group data on said at least one data storage system; and
   if said group definition is a remote mirror definition that corresponds to said group data on said at least one data storage system, storing data for said remote mirror in said group definition on said remote data storage system.

19. The method of claim 18, wherein said determining whether said group definition is a remote mirror definition that corresponds to said group data on said at least one data storage system uses the second attribute and a generation number included in said remote mirror definition.

20. The method of claim 18, further comprising:
   creating a new group definition on said remote data storage system corresponding to said group if a group definition having said first name does not exist.

21. The method of claim 20, wherein said new group definition includes at least the second attribute indicating that said new group definition is a remote mirror, and a value indicating that said new group definition corresponds to said group data on said at least one data storage system.

22. The method of claim 1, wherein said group data defines a set of one or more associated devices that are local to a host.

23. The method of claim 22, wherein said device and said other device are defined as a local and remote device pairing.

24. The method of claim 1, wherein said group has a corresponding name used to reference one or more devices included in said group.

25. A system for defining a group of one or more devices, comprising:
   a host;
   a local data storage system directly connected to said host, said local data storage system including one or more local devices;
   a remote data storage system connected to said local data storage system, said remote data storage system including one or more remote devices;
   a first memory of said local data storage system that stores group data for said group, said group including a first device from said local data storage system and identifying a second device of said remote data storage system, wherein said group data includes information used in connection with describing the group, the information used in connection with describing the group including a group definition that defines attributes of the group;
   a second memory of said remote data storage system that stores the group data for a remote mirror of said group, said remote mirror including said second device as a local device and said first device as a remote device; and
   wherein said host includes code that determines, using the group data, whether said group can have a remote mirror and stores said group data in said second memory if said group can have the remote mirror, wherein said group data on said local one data storage system includes a data storage system identifier identifying said remote data storage system as a designated remote data storage system of the remote mirror and a first attribute denoting that the group has a remotely defined counterpart group on said remote data storage system, the first being different from the data storage system identifier identifying said remote data storage system, and wherein said remote mirror of said group data on said remote data storage system includes a data storage system identifier identifying said at least one data storage system and a second attribute which is a complementary attribute of said first attribute and which denotes that said remote mirror is the remotely defined counterpart group on the remote data storage system, the second attribute being different from the data storage system identifier identifying said at least one data storage system.

26. The system of claim 25, wherein said host includes code that:
   determines whether said first device and said second device are defined as a device pairing indicating that said group can have a remote mirror.

27. The system of claim 25, wherein said remote mirror of said group includes group data from said first memory modified in accordance with a point of view of the remote data storage system and a remote host wherein said remote data storage system is local with respect to said remote host.

28. The system of claim 25, wherein said group has a corresponding name used to reference said one or more devices included in said group.

29. A computer program product for storing data about a group, said computer program product including a non-transitory computer readable storage medium comprising code that:
   stores, on at least one data storage system, group data if a device of said at least one data storage system is included in said group, wherein the group data includes information used in connection with describing the group, the information used in connection with describing the group including a group definition that defines attributes of the group;
   determines, using the group data, whether the group can have a remote mirror, wherein determining whether the group can have a remote mirror includes determining if said device is associated with another device on a remote data storage system; and
   if the group can have the remote mirror, stores a remote mirror of said group data on said remote data storage system, wherein said group data on said at least one data storage system includes a data storage system identifier identifying said remote data storage system as a designated remote data storage system of the remote mirror and a first attribute denoting that the group has a remotely defined counterpart group on said remote data storage system, the first attribute being different from the data storage system identifier identifying said remote data storage system, and wherein said remote mirror of said group data on said remote data storage system includes a data storage system identifier identifying said at least one data storage system and a second attribute which is a complementary attribute of said first attribute and which denotes that said remote mirror is the remotely defined counterpart group on the remote data storage system, the second attribute being different from the data storage system identifier identifying said at least one data storage system.

30. The computer program product of claim 29, wherein said group data includes at least one of: a device identifier, an attribute of a device in said group, a group attribute, and an attribute indicating that said group can have a remote mirror.

31. The computer program product of claim 29, wherein said group data is distributed on one or more data storage systems, and if a device from a first data storage system belongs to said group, a portion of said group data for said group related to said first data storage system is stored on said first data storage system.

32. The computer program product of claim 31, wherein group data stored on a data storage system is stored in a portion of memory of said data storage system which is accessible to each of a plurality of hosts utilizing said group data.

33. The computer program product of claim 32, wherein each of said plurality of hosts obtains said group data by a process on said each host accessing said portion of memory of said each data storage system.

34. The computer program product of claim 29, wherein said group data is stored locally at each of said plurality of hosts.

35. The computer program product of claim 31, wherein said code that determines whether group data for said group is included in each of said plurality of data storage systems is executed on each of said plurality of hosts.

36. The computer program product of claim 35, wherein an application uses information about said group.

37. The computer program product of claim 35, wherein said process obtains updated group information by one of: said process polling each of said plurality of data storage systems at predetermined intervals, and by said process being notified when an update has been made to group data.

38. The computer program product of claim 29, wherein said remote mirror of said group data is created in accordance with a specified option enabling or disabling creation of remote mirrors of said group data.

39. The computer program product of claim 29, wherein said remote mirror of said group data includes a first portion of data that is a modified portion of said group data in accordance with a viewpoint of said remote data storage system.

40. The computer program product of claim 39, wherein said remote mirror includes a second portion of data that is a copy of a portion of said group data.

41. The computer program product of claim 40, further comprising code that:
 determines a third portion of said group data that is omitted when storing data for said remote mirror of said group data, said third portion being data that is not applicable to said remote data storage system.

42. The computer program product of claim 29, wherein said code that stores said remote mirror of said group data is executed in response to at least one of: defining a new group, modifying an existing group, and changing device pairings of a local and a corresponding remote device.

43. The computer program product of claim 29, wherein said remote mirror of said group is used by a host connected to the remote data storage system when said at least one data storage system is unavailable.

44. The computer program product of claim 29, wherein said storing of said remote mirror is performed using an asynchronous process maintaining said remote mirror by copying group data from said at least one data storage system to said remote data storage system.

45. The computer program product of claim 29, wherein said group is a first group having a first name, and the computer program product further comprising code that:
 determines whether there is a group having said first name on said remote data storage system, and wherein said storing is performed when there is no group having said first name on said remote data storage system.

46. The computer program product of claim 45, further comprising code that:
 determines whether a group definition exists on said remote data storage system having said first name;
 if a group definition having said first name exists, determines whether said group definition is a remote mirror definition that corresponds to said group data on said at least one data storage system; and
 if said group definition is a remote mirror definition that corresponds to said group data on said at least one data storage system, stores data for said remote mirror in said group definition on said remote data storage system.

47. The computer program product of claim 46, wherein said code that determines whether said group definition is a remote mirror definition that corresponds to said group data on said at least one data storage system uses the second attribute and a generation number included in said remote mirror definition.

48. The computer program product of claim 46, further comprising code that:
 creates a new group definition on said remote data storage system corresponding to said group if a group definition having said first name does not exist.

49. The computer program product of claim 48, wherein said new group definition includes at least the second attribute indicating that said new group definition is a remote mirror, and a value indicating that said new group definition corresponds to said group data on said at least one data storage system.

50. The computer program product of claim 29, wherein said group data defines a set of one or more associated devices that are local to a host.

51. The computer program product of claim 50, wherein said device and said other device are defined as a local and remote device pairing.

52. The computer program product of claim 29, wherein said group has a corresponding name used to reference one or more devices included in said group.

* * * * *